United States Patent
Jales et al.

(10) Patent No.: US 10,838,040 B2
(45) Date of Patent: Nov. 17, 2020

(54) DETECTION AND RANGING SYSTEMS AND METHODS

(71) Applicant: FLIR Belgium BVBA, Meer (BE)

(72) Inventors: Richard Jales, Eastleigh (GB);
Nicholas St. Hill, London (GB);
Stephen Tostevin, Chichester (GB)

(73) Assignee: FLIR BELGIUM BVBA, Meer (BE)

( * ) Notice: Subject to any disclaimer, the term of this patent is extended or adjusted under 35 U.S.C. 154(b) by 252 days.

(21) Appl. No.: 15/977,095

(22) Filed: May 11, 2018

(65) Prior Publication Data

US 2018/0259618 A1 Sep. 13, 2018

Related U.S. Application Data

(63) Continuation of application No. PCT/US2016/061449, filed on Nov. 10, 2016.
(Continued)

(51) Int. Cl.
*G01S 7/292* (2006.01)
*G01S 7/32* (2006.01)
(Continued)

(52) U.S. Cl.
CPC ............ *G01S 7/2922* (2013.01); *G01S 7/023* (2013.01); *G01S 7/288* (2013.01); *G01S 7/32* (2013.01);
(Continued)

(58) Field of Classification Search
CPC ........ G01S 7/2922; G01S 7/288; G01S 13/28; G01S 7/023; G01S 13/10
(Continued)

(56) References Cited

U.S. PATENT DOCUMENTS 6,166,678 A  12/2000  Jao
6,621,454 B1  9/2003  Reudink et al.
(Continued)

FOREIGN PATENT DOCUMENTS

EP           0660135      6/1995
EP           0971242     12/2000
WO    WO 2013/162657    10/2013

OTHER PUBLICATIONS

Allen, Chris, "Radar Pulse Compression," ITTC Summer 2004 Lecture Series, Jun. 17, 2004, 19 Pages, Kansas.
(Continued)

*Primary Examiner* — Bo Fan
(74) *Attorney, Agent, or Firm* — Haynes and Boone, LLP

(57) ABSTRACT

Techniques are disclosed for detection and ranging systems and methods to improve range resolution, target separation, and reliability. A method includes selectively attenuating a signal representing a ranging system return or echo from targets so as to suppress side lobes or other undesirable artifacts appearing in the signal due to noise, interference, and/or distortion. A method may additionally or alternatively include rejecting interference events in ranging system returns by comparing a received return with that expected from a target illuminated by the ranging system, as determined by characteristics of its particular ranging sensor, and rejecting or attenuating returns or portions of returns that fail to match those characteristics in time or space. A system configured to perform such methods and comprising a transducer/antenna, a transceiver, a controller, and/or other logic devices implementing a pulse generator, correlator, selective attenuator, comparator, buffer, subtractor, and/or output circuit is also disclosed.

20 Claims, 16 Drawing Sheets

A frequency modulated pulse with a triangular envelope, a unit impulse target, 0, k1 = 0.5 and k2 = 10.

Related U.S. Application Data

(60) Provisional application No. 62/255,355, filed on Nov. 13, 2015, provisional application No. 62/255,351, filed on Nov. 13, 2015.

(51) Int. Cl.

| | |
|---|---|
| *G01S 7/52* | (2006.01) |
| *G01S 15/10* | (2006.01) |
| *G01S 15/89* | (2006.01) |
| *G01S 7/288* | (2006.01) |
| *G01S 13/28* | (2006.01) |
| *G01S 7/02* | (2006.01) |
| *G01S 13/10* | (2006.01) |
| *G01S 7/527* | (2006.01) |
| *G01S 13/26* | (2006.01) |

(52) U.S. Cl.
CPC ........ *G01S 7/52003* (2013.01); *G01S 7/5273* (2013.01); *G01S 13/10* (2013.01); *G01S 13/26* (2013.01); *G01S 13/28* (2013.01); *G01S 15/101* (2013.01); *G01S 15/104* (2013.01); *G01S 15/89* (2013.01)

(58) Field of Classification Search
USPC .................................................. 342/90, 145
See application file for complete search history.

(56) References Cited

U.S. PATENT DOCUMENTS

| | | | |
|---|---|---|---|
| 8,169,362 | B2 | 5/2012 | Cook et al. |
| 8,259,003 | B2 | 9/2012 | Song |
| 9,055,592 | B2 | 6/2015 | Clegg |
| 9,071,337 | B2 | 6/2015 | Hellsten |
| 2005/0180530 | A1 | 8/2005 | Reiche |
| 2013/0249730 | A1 | 9/2013 | Adcook |
| 2013/0342381 | A1* | 12/2013 | Nakagawa .............. G01S 7/292 342/90 |
| 2018/0259618 | A1* | 9/2018 | Jales ..................... G01S 7/5273 |

OTHER PUBLICATIONS

Amin Nasrabadi et al., "A Survey on the Design of Binary Pulse Compression Codes with Low Autocorrelation," Trends in Telecommunications Technologies, Mar. 1, 2010, pp. 39-62, InTech.

Aparicio et al., "Pulse compression for different types of radar signals." Blekinge Institute of Technology, Thesis No. MCS-2012-09, Sep. 2012, pp. 1-81.

"Chapter 7: Pulse Compression," Digital Signal Processing, 2000, 35 Pages, Chapman & Hall.

Farnett et al., "Pulse Compression Radar," Radar Handbook, 1990, pp. 10.1-10.39, McGraw-Hill, New York and London.

"Interference mitigation options to enhance compatibility between radar systems and digital radio-relay systems," International Telecommunication Union, ITU-R F.1097-1, 2010, 30 Pages, Geneva.

Kiranmai et al., "Performance Evaluation of Barker Codes Using New Pulse Compression Technique," International Journal of Computer Applications, Dec. 2014, 4 Pages, vol. 107, No. 22.

Kunert et al., "Study on the state-of-the-art interference mitigation techniques," MOre Safety for All by Radar Interference Mitigation (MOSARIM), Jun. 28, 2010, 70 Pages, Contract No. 248231, Version 1.6.

Melvin, William L., "Radar Adaptive Interference Mitigation," Georgia Tech Research Institute, [retrieved on Oct. 17, 2018], 42 Pages [online], ISART 2011, Boulder, CO. Retrieved from the Internet: <https://www.its.bldrdoc.gov/media/31117/MelvinAdaptiveInterferenceMitigation_ISART2011.pdf>.

Papadoupulos, Karl, "Strong Radar Signals: xG Technology (XGTI) $2^{nd}$ New US Patent Award This Week, Palo Alto Networks (PANW) Numbers and Upgraded on Settlement," StocksStar, May 29, 2014, [retrieved on Oct. 18, 2018], 5 Pages [online]. Retrieved from the Internet: <http://stocksstar.ning.com/profiles/blogs/strong-radar-signals-xg-technology-xgti-2nd-new-us-patent-award>.

Priyanka et al., "Pulse Compression Techniques for Target Detection," International Journal of Computer Applications, Jun. 2014, 6 Pages, vol. 96, No. 22.

"Pulse compression," Wikipedia, [retrieved on Oct. 18, 2018], 10 Pages [online]. Retrieved from the Internet: <https://en.wikipedia.org/wiki/Pulse_compression>.

"Radar Basics—Pulse Compression," Radar Tutorial, [retrieved on Oct. 18, 2018], 4 Pages [online]. Retrieved from the Internet: <http://www.radartutorial.eu/08.transmitters/Intrapulse%20Modulation.en.html>.

"Radar/WiMax® Network Interference Mitigation," WiMax Forum WhitePaper, WMF-M14-002-v01, Dec. 14, 2012, pp. 1-12.

Rawat et al., "High Resolution Low Power Radar Pulse Compression Techniques," International Journal of Advanced Research in Electrical, Electronics and Instrumentation Engineering, Apr. 2014, pp. 8928-8935, vol. 3, Issue 4.

"Signal and Data Processing," Propagation Research Associates, Inc., [retrieved on Oct. 17, 2018], 2 Pages [online]. Retrieved from the Internet: <http://www.pra-corp.com/processing.php>.

Subbarao et al., "Cross-correlation based compression technique for frequency modulated thermal wave imaging," $10^{th}$ International Conference on Quantitative InfraRed Thermography, Jul. 27-30, 2010, 7 Pages, Quebec, Canada.

"WAAS G-II GNSS Reference Receiver," Novatel, [retrieved on Oct. 18, 2018], 2 Pages [online]. Retrieved from the Internet: <https://novatel.com/products/gnss-receivers/ground-reference-and-uplink-receivers/specialty-ground-reference-receivers/waas-g-ii/>.

* cited by examiner

A frequency modulated pulse with a triangular envelope, a unit impulse target, 0, k1 = 0.5 and k2 = 10.

A frequency modulated pulse with a triangular envelope, a target of size 10 samples, with w3 = 0, k1 = 0.5 and k2 = 10.

Two impulses of different amplitudes separated, using a frequency modulated pulse with a triangular envelope, with w3 = 0, k1 = 0.5 and k2 = 10.

Two impulses of different amplitudes separated, using a frequency modulated pulse with a trapezoidal envelope, with w3 = 0, k1 = 0.5 and k2 = 10.

A frequency modulated pulse with a Gaussian envelope, a unit impulse target, with w3 = 0, k1 = 0.5 and k2 = 10

A square pulse of size 5 without frequency modulation, a unit impulse target, with w3 = 0, k1 = 0.75 and k2 = 10.

1: function F(x)
2:
3:   B[j] ← x
4:
5:   if B[j] > $A_T$ then                    ▷ Compare to amplitude threshold
6:     C[j] ← 1
7:   else
8:     C[j] ← 0
9:   end if
10:
11:  if $\sum C$ < N then                    ▷ If large target ignore gradient check
12:
13:    g1 ← |B[k] - B[l]|
14:    g2 ← (B[k] + 1)gmax
15:
16:    if g1 > g2 then
17:      B[k] ← min (B[k], B[l])
18:    end if
19:  end if
20:  y ← b[k]                                ▷ Write the output
21:
22:  j ← mod (j, N) + 1
23:  k ← mod (k, N) + 1
24:  l ← mod (l, N) + 1
25:
26:  return y
27: end function

```
function (y) = InterferenceRejectGrad (x, lim, max_ampl, min_target)
% Function used to reject non-convolved targets.
%
% The extent check may be disabled by setting the min_target
% variable to zero
%
% Inputs
%       x - Input vector
%       lim - gradient limit
%       max_ampl - maximum allowed amplitude
%       min_target - minimum target width
%
% Output
%       y - Processed output vector % Set a switch to determine the default boundary
min_win = 2;

if min_target == 0
     % Disable the minimum target type functionality
     min_target = min_win + 1;
     N = min_win;
else
     min_target = max(min_win, min_target);
     N = min_target;
end % Create a buffer for comparison window
maxbuf = zeros (N, 1);         ← 910
ybuf  = zeros (N, 1);

x = abs (x);
y = zeros (size(x));

amplitude_threshold = 0.5 * max_ampl; %

% Indices to the max buffer, ybuffer
```

```
j = N;
k = 2;
l = 1;
for n=N:length (y)
    % Place the most recently read data in the buffer
    ybuf (j) = x(n);

% Check whether the amplitude threshold is exceeded
    if ybuf(j) > amplitude_threshold
        maxbuf (j) = 1;
    else
        maxbuf (j) = 0;
    end                                                    }912 if sum (maxbuf (:)) < min_target
        y_diff = abs(diff(ybuf([k,l])));
        lim1 = (ybuf(k) +1) * lim;              }914
        if (y_diff > lim1 )
            ybuf(k) = min(ybuf([k, l]));    ←—916
        end
    end % Output the new result
    y(n - N + 1) = ybuf(k);

% Update the circular buffer indices
    j = mod(j,N) + 1;
    k = mod(k,N) + 1;              }918
    l = mod(l,N) + 1;
end end
```

FIG. 9B

An impulse target and interfernce of extent 5 are presented (a) without processing and (b) with processing A small clipped target and interfernce of extent 5 are presented (a) without processing and (b) with processing

DETECTION AND RANGING SYSTEMS AND METHODS

CROSS REFERENCE TO RELATED APPLICATIONS

This application is a continuation of International Patent Application No. PCT/US2016/061449 filed Nov. 10, 2016 and entitled "DETECTION AND RANGING SYSTEMS AND METHODS," which is incorporated herein by reference in its entirety International Patent Application No. PCT/US0216/061449 filed Nov. 10, 2016 claims the priority to and the benefit of U.S. Provisional Patent Application No. 62/255,355 filed Nov. 13, 2015 and entitled "DETECTION AND RANGING SYSTEMS AND METHODS" and is hereby incorporated by reference in its entirety.

International Patent Application No. PCT/US0216/061449 filed Nov. 10, 2016 claims the priority to and the benefit of U.S. Provisional Patent Application No. 62/255,351 filed Nov. 13, 2015 and entitled "DETECTION AND RANGING SYSTEMS AND METHODS" and is hereby incorporated by reference in its entirety.

TECHNICAL FIELD

One or more embodiments of the invention relate generally to detection and ranging systems and more particularly, for example, to systems and methods for improved deconvolution of targets and/or interference rejection with detection and ranging systems.

BACKGROUND

Detection and ranging systems, such as radar, sonar, lidar, and/or other ranging sensory systems, are often used to assist in navigation by producing data and/or imagery of the environment surrounding a mobile structure, such as imagery representing above-surface and/or subsurface features critical to navigation of a watercraft over a body of water. Detection and ranging systems typically transmit a pulse toward a target and receive an echo of the pulse reflected from the target, and the received echo can be processed to detect and determine the range to the target. Such processing typically involves deconvolving the received signal to identify, separate, or reconstruct a signal indicative of the echo reflected from the target.

However, most detection and ranging systems are not capable of transmitting a short pulse with a peak transmit power that permits deconvolution of targets with a desired range resolution and target separation. While signal processing techniques such as pulse compression techniques may be employed to improve range resolution and target separation, pulse compression introduces range side lobes that can make the target appear to have a much larger range extent than in reality, and thus can often degrade range resolution and target separation. Furthermore, interference, distortion, or other artifacts affecting the received signal may also degrade range resolution and target separation.

SUMMARY

Techniques are disclosed for detection and ranging systems and methods to improve range resolution, target separation, and reliability. Systems and methods according to one or more embodiments of the disclosure may selectively attenuate (e.g., selectively reduce or remove) a signal representing a ranging system return or echo from targets so as to suppress (e.g., reduce or remove) side lobes or other undesirable artifacts appearing in the signal due to noise, interference, and/or distortion. Systems and methods according to one or more embodiments of the disclosure may reliably reject interference events in ranging system returns by comparing a received return with that expected from a target illuminated by the ranging system, as determined by characteristics of its particular ranging sensor, and rejecting or attenuating returns or portions of returns that fail to match those characteristics in time or space.

In one embodiment, a method includes transmitting a pulse having a carrier wave toward a target, receiving at least a portion of the pulse reflected from the target as a return signal, determining a correlated return signal based on the return signal and the pulse, comparing the correlated return signal against one or more bounds that are determined relative to the return signal, attenuating those portions of the correlated return signal that fall outside of the one or more bounds, and providing the correlated return signal with weakly correlated and/or distorted portions suppressed by the attenuating. The lower and the upper bounds may be determined based on scaled versions of the return signal, scaled according to the energy in the pulse. A frequency or a phase of the carrier wave within the pulse may be modulated to perform pulse compression in some embodiments, and side lobes appearing in the correlated return signal due to the pulse compression may be effectively suppressed by the attenuating. The pulse may be a radar pulse or a sonar pulse, and an envelope of the pulse may be shaped into a rectangular, triangular, trapezoidal, or Gaussian envelope.

In another embodiment, a system includes a transceiver/controller comprising a pulse generator circuit configured to generate a pulse having a carrier wave, a correlator circuit configured to determine a correlated return signal based on a return signal and the pulse, the return signal representing at least a portion of the pulse reflected from a target, a selective attenuation circuit configured to compare the correlated return signal against one or more bounds that are determined relative to the return signal and attenuate those portions of the correlated return signal that fall outside of the one or more bounds, and an output circuit configured to provide the correlated return signal as a target ranging signal with weakly correlated and/or distorted portions of the correlated return signal suppressed by the selective attenuation circuit. The system also includes a transducer or antenna coupled to the transceiver/controller and configured to transmit the pulse toward the target and receive the at least a portion of the pulse reflected from the target. The correlator circuit may be configured to determine the correlated return signal at least by determining a cross-correlation between the return signal and the pulse. The correlator circuit and/or the selective attenuation circuit may be implemented in a field programmable gate array (FPGA), a digital signal processor (DSP), or a combination of an FPGA and a DSP. The system may include a radar system in which the carrier wave for the pulse is a radio frequency (RF) wave, or a sonar system in which the carrier wave for the pulse is an audio frequency (AF) wave.

In another embodiment, a method includes receiving first and second sensor returns from a ranging system, determining a gradient of the first and/or second sensor return, and attenuating the first and/or second sensor return based, at least in part, on the determined gradient and/or a gradient limit for the ranging system. The first and second sensor returns may be radar system sensor returns that are adjacent in azimuth to each other, or sonar system sensor returns that are adjacent in range to each other. The first and/or second sensor return may be determined at least by subtracting the first sensor return from the second sensor return, determining that the first or second sensor return has a larger amplitude than the other, and attributing the gradient to the larger amplitude sensor return. The first and/or second sensor return may be attenuated at least by setting a first amplitude of the first sensor return to a second amplitude of the second sensor return if the determined gradient is larger than the gradient limit, retaining a first amplitude of the first sensor return and a second amplitude of the second sensor return if the determined gradient is equal to or smaller than the gradient limit, or setting a first amplitude of the first sensor return and/or a second amplitude of the second sensor return to zero. The method according to some embodiments may further include determining that the first and/or second sensor return represents an actual target response and outputting the first and/or second sensor return through a delay buffer.

In another embodiment, a system includes a logic device configured to communicate with a ranging system, wherein the logic device is configured to receive first and second sensor returns from the ranging system, determine a gradient of the first and/or second sensor return, and attenuate the first and/or second sensor return based, at least in part, on the determined gradient and/or a gradient limit for the ranging system. The logic device according to some embodiments may include a subtractor configured to determine the gradient of the first and/or second sensor return; and a selective attenuator configured attenuate the first and/or second sensor return based, at least in part, on the determined gradient and/or a gradient limit for the ranging system. In some embodiments, the system may also include a user interface, and the logic device may be configured to generate image data including the first and/or second sensor returns, and display the image data using a display of the user interface.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 8 illustrates an interference filter for a ranging system in accordance with an embodiment of the disclosure.

FIGS. 9A-B illustrate an interference filter for a ranging system in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Figure 1A:
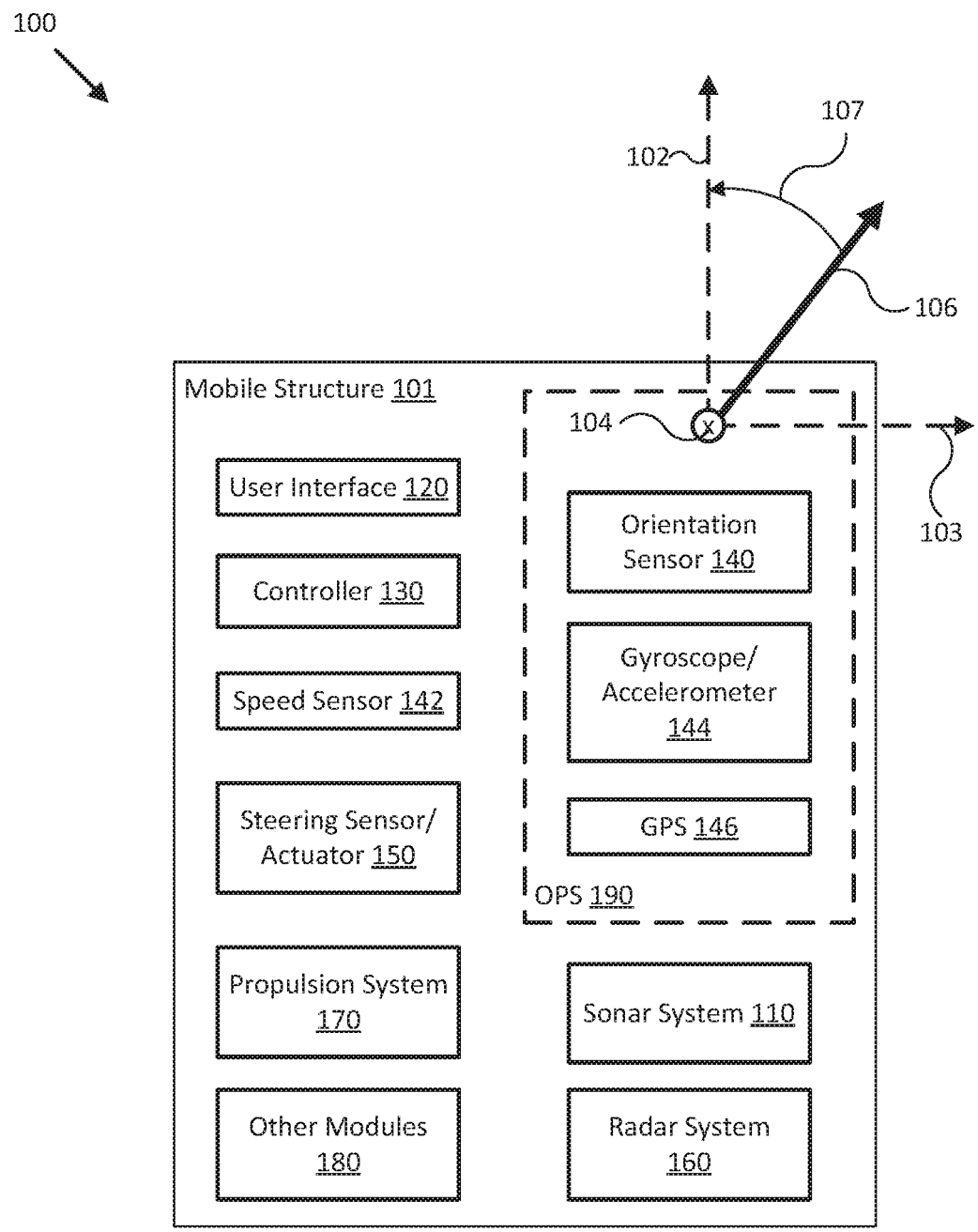
FIG. 1A illustrates a block diagram of a remote sensing imagery system in accordance with an embodiment of the disclosure.

FIG. 1A illustrates a block diagram of detection and ranging system 100 in accordance with an embodiment of the disclosure. In various embodiments, system 100 may be configured to detect a target and/or determine a range to a target using a sonar system 110 and/or a radar system 160. In this regard, sonar system 110 and/or radar system 160 may be configured to transmit a pulse, or a series of pulses (also referred to as a pulse train), toward a target and receive at least a portion of the transmitted pulse reflected from the target as a return signal (also referred to as an echo). System 100 may then process the return signal to deconvolve the target (e.g., identify, separate, or reconstruct a signal indicative of the echo reflected from the target). In various embodiments, system 100 may be configured to selectively attenuate (e.g., selectively reduce or remove) portions of a signal representing a return or echo from the targets so as to suppress (e.g., reduce or remove) undesirable portions of the signal. For example, side lobes in a correlated return signal (e.g., side lobes appearing due to pulse compression of the transmitted pulse), interference, distortion (e.g., due to clipping), artifacts, or otherwise weakly correlated portions of a return signal may beneficially be suppressed by system 100 according to one or more embodiments of the disclosure.

In some embodiments, system 100 may be configured to measure an orientation, a position, an acceleration, and/or a speed of sonar system 110, radar system 160, user interface 120, and/or mobile structure 101 using any of the various sensors of OPS 190 and/or system 101. System 100 may then use these measurements to generate accurate image data from sonar data provided by sonar system 110, radar data provided by radar system 160, and/or other ranging system data provided by a different type of ranging system (e.g., other modules 180), according to a desired operation of system 100 and/or mobile structure 101. In some embodiments, system 100 may display resulting imagery to a user through user interface 120, and/or use the sonar data, radar data, orientation and/or sensor data, and/or imagery to control operation of mobile structure 101, such as controlling steering actuator 150 and/or propulsion system 170 to steer mobile structure 101 according to a desired heading, such as heading angle 107, for example.

In the embodiment shown in FIG. 1A, system 100 may be implemented to provide sonar data and/or imagery for a particular type of mobile structure 101, such as a drone, a watercraft, an aircraft, a robot, a vehicle, and/or other types of mobile structures, including any platform designed to move through or under the water, through the air, and/or on a terrestrial surface. In one embodiment, system 100 may include one or more of a sonar system 110, a radar system 160, a user interface 120, a controller 130, an OPS 190 (e.g., including an orientation sensor 140, a gyroscope/accelerometer 144, and/or a global positioning satellite system (GPS) 146), a speed sensor 142, a steering sensor/actuator 150, a propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope 144 and accelerometer 145). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, True North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation). In some embodiments, directional measurements may initially be referenced to a coordinate frame of a particular sensor (e.g., a sonar transducer assembly or other module of sonar system 110, OPS 190, orientation sensor 140, and/or user interface 120, for example) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 and referenced to a local gravitational vector but with an unreferenced and/or undefined yaw reference (e.g., no reference to Magnetic North).

Sonar system 110 may be implemented as one or more electrically and/or mechanically coupled controllers, transmitters, receivers, transceivers, signal processing logic devices, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein.

For example, in various embodiments, sonar system 110 may be implemented and/or operated according to any of the systems and methods described in U.S. Provisional Patent Application 62/005,838 filed May 30, 2014 and entitled "MULTICHANNEL SONAR SYSTEMS AND METHODS", and/or U.S. Provisional Patent Application 61/943, 170 filed Feb. 21, 2014 and entitled "MODULAR SONAR TRANSDUCER ASSEMBLY SYSTEMS AND METHODS", both of which are hereby incorporated by reference in their entirety. In other embodiments, sonar system 110 may be implemented according to other sonar system arrangements (e.g., remote sensing system arrangements) that can be used to detect objects within a water column and/or a floor of a body of water.

More generally, sonar system 110 may be configured to emit one, multiple, or a series of acoustic pulses (e.g., pulses having audio frequency waves as a carrier), receive corresponding acoustic returns (e.g., echoes), and convert the acoustic returns into sonar data and/or imagery (e.g., remote sensor image data), such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

In some embodiments, sonar system 110 may be implemented using a compact design, where multiple sonar transducers, sensors, and/or associated processing devices are located within a single transducer assembly housing that is configured to interface with the rest of system 100 through a single cable providing both power and communications to and from sonar system 110. In some embodiments, sonar system 110 may include orientation and/or position sensors configured to help provide two or three dimensional waypoints, increase sonar data and/or imagery quality, and/or provide highly accurate bathymetry data, as described herein.

For example, fisherman desire highly detailed and accurate information and/or imagery of underwater structure and mid water targets (e.g., fish). Conventional sonar systems can be expensive and bulky and typically cannot be used to provide relatively accurate and/or distortion free underwater views, as described herein. Embodiments of sonar system 110 include low cost single, dual, and/or multichannel sonar systems that can be configured to produce detailed two and three dimensional sonar data and/or imagery. In some embodiments, sonar system 110 may consolidate electronics and transducers into a single waterproof package to reduce size and costs, for example, and may be implemented with a single connection to other devices of system 100 (e.g., via an Ethernet cable with power over Ethernet, an integral power cable, and/or other communication and/or power transmission conduits integrated into a single interface cable).

In various embodiments, sonar system 110 may be configured to provide many different display views from a variety of selectable perspectives, including down imaging, side imaging, and/or three dimensional imaging, using a selection of configurations and/or processing methods, as described herein. In some embodiments, sonar system 110 may be implemented with a single transducer assembly housing incorporating one or two transducers and/or associated electronics. In other embodiments, sonar system 110 may be implemented with a transducer assembly housing incorporating a multichannel transducer and/or associated electronics. In such embodiments, sonar system 110 may be configured to transmit acoustic beams using a transmission channel and/or element of a multichannel transducer, receive acoustic returns using multiple receive channels and/or elements of the multichannel transducer, and to perform beamforming and/or interferometry processing on the acoustic returns to produce two and/or three dimensional sonar imagery. In some embodiments, one or more sonar transmitters of sonar system 110 may be configured to use CHIRP transmissions to improve range resolution and hence reduce ambiguities typically inherent in interferometry processing techniques.

In various embodiments, sonar system 110 may be implemented with its own dedicated OPS 190, which may include various orientation and/or position sensors (e.g., similar to orientation sensor 140, gyroscope/accelerometer 144, and/or GPS 146) that may be incorporated within the transducer assembly housing to provide three dimensional orientations and/or positions of the transducer assembly and/or transducer(s) for use when processing or post processing sonar data for display. The sensor information can be used to correct for movement of the transducer assembly between ensonifications to provide improved alignment of corresponding acoustic returns/samples, for example, and/or to generate imagery based on the measured orientations and/or positions of the transducer assembly. In other embodiments, an external orientation and/or position sensor can be used alone or in combination with an integrated sensor or sensors.

In embodiments where sonar system 110 is implemented with a position sensor, sonar system 110 may be configured to provide a variety of sonar data and/or imagery enhancements. For example, sonar system 110 may be configured to provide accurate positioning of sonar data and/or user-defined waypoints remote from mobile system 101. Similarly, sonar system 110 may be configured to provide accurate two and/or three dimensional aggregation and/or display of a series of sonar data; without position data, a sonar system typically assumes a straight track, which can cause image artifacts and/or other inaccuracies in corresponding sonar data and/or imagery. Additionally, when implemented with a position sensor and/or interfaced with a remote but relatively fixed position sensor (e.g., GPS 146), sonar system 110 may be configured to generate accurate and detailed bathymetric views of a floor of a body of water.

In embodiments where sonar system 110 is implemented with an orientation and/or position sensor, sonar system 110 may be configured to store such location/position information along with other sensor information (acoustic returns, temperature measurements, text descriptions, water depth, altitude, mobile structure speed, and/or other sensor and/or control information) available to system 100. In some embodiments, controller 130 may be configured to generate a look up table so that a user can select desired configurations of sonar system 110 for a particular location or to coordinate with some other sensor information. Alternatively, an automated adjustment algorithm can be used to select optimum configurations based on the sensor information.

For example, in one embodiment, mobile structure 101 may be located in an area identified on an chart using position data, a user may have selected a user setting for a configuration of sonar system 110, and controller 130 may be configured to control an actuator and/or otherwise implement the configuration for sonar system 110 (e.g., to set a particular orientation). In still another embodiment, controller 130 may be configured to receive orientation measurements for mobile structure 101. In such embodiment, controller 130 may be configured to control the actuators associated with the transducer assembly to maintain its orientation relative to, for example, the mobile structure and/or the water surface, and thus improve the displayed sonar images (e.g., by ensuring consistently oriented acoustic beams and/or proper registration of a series of acoustic returns). In various embodiments, controller 130 may be configured to control steering sensor/actuator 150 and/or propulsion system 170 to adjust a position and/or orientation of mobile structure 101 to help ensure proper registration of a series of acoustic returns, sonar data, and/or sonar imagery.

Although FIG. 1A shows various sensors and/or other components of system 100 separate from sonar system 110, in other embodiments, any one or combination of sensors and components of system 100 may be integrated with a sonar assembly, an actuator, a transducer module, and/or other components of sonar system 110. For example, OPS 190 may be integrated with a transducer module of sonar system 110 and be configured to provide measurements of an absolute and/or relative orientation (e.g., a roll, pitch, and/or yaw) of the transducer module to controller 130 and/or user interface 120, both of which may also be integrated with sonar system 110.

Radar system 160 may be implemented as one or more electrically and/or mechanically coupled controllers, transmitters, receivers, transceivers, signal processing logic devices, various electrical components, antenna elements of various shapes and sizes, multichannel antennas/antenna modules, radar assemblies, assembly brackets, mast brackets, and/or various actuators adapted to adjust orientations of any of the components of radar system 160, as described herein. For example, in various embodiments, radar system 160 may be implemented according to various radar system arrangements (e.g., detection and ranging system arrangements) that can be used to detect features of and determine a distance to objects on or above a terrestrial surface or a surface of a body of water.

More generally, radar system 160 may be configured to emit one, multiple, or a series of radar pulses (e.g., pulses having a radio frequency wave as a carrier), receive corresponding radar returns (e.g., echoes), and convert the radar returns into radar data and/or imagery (e.g., remote sensor image data), such as one or more intensity plots and/or aggregation of intensity plots indicating a relative position, orientation, and/or other characteristics of structures, weather phenomena, waves, other mobile structures, surface boundaries, and/or other objects reflecting the radar pulses back at radar system 160. Sonar system 110 may be configured to provide such data and/or imagery to user interface 120 for display to a user, for example, or to controller 130 for additional processing, as described herein. Moreover, such data may be used to generate one or more charts corresponding to AIS data, ARPA data, MARPA data, and or one or more other target tracking and/or identification protocols.

In some embodiments, radar system 160 may be implemented using a compact design, where multiple radar antennas, sensors, and/or associated processing devices are located within a single radar assembly housing that is configured to interface with the rest of system 100 through a single cable providing both power and communications to and from radar system 160. In some embodiments, radar system 160 may include orientation and/or position sensors (e.g., OPS 190) configured to help provide two or three dimensional waypoints, increase radar data and/or imagery quality, and/or provide highly accurate radar image data, as described herein.

For example, fisherman desire highly detailed and accurate information and/or imagery of local and remote structures and other watercraft. Conventional radar systems can be expensive and bulky and typically cannot be used to provide relatively accurate and/or distortion free radar image data, as described herein. Embodiments of radar system 160 include low cost single, dual, and/or multichannel (e.g., synthetic aperture) radar systems that can be configured to produce detailed two and three dimensional radar data and/or imagery. In some embodiments, radar system 160 may consolidate electronics and transducers into a single waterproof package to reduce size and costs, for example, and may be implemented with a single connection to other devices of system 100 (e.g., via an Ethernet cable with power over Ethernet, an integral power cable, and/or other communication and/or power transmission conduits integrated into a single interface cable).

In various embodiments, radar system 160 may be implemented with its own dedicated OPS 190, which may include various orientation and/or position sensors (e.g., similar to orientation sensor 140, gyroscope/accelerometer 144, and/or GPS 146) that may be incorporated within the radar assembly housing to provide three dimensional orientations and/or positions of the radar assembly and/or antenna(s) for use when processing or post processing radar data for display. The sensor information can be used to correct for movement of the radar assembly between beam emissions to provide improved alignment of corresponding radar returns/samples, for example, and/or to generate imagery based on the measured orientations and/or positions of the radar assembly/antenna. In other embodiments, an external orientation and/or position sensor can be used alone or in combination with an integrated sensor or sensors.

In embodiments where radar system 160 is implemented with a position sensor, radar system 160 may be configured to provide a variety of radar data and/or imagery enhancements. For example, radar system 160 may be configured to provide accurate positioning of radar data and/or user-defined waypoints remote from mobile system 101. Similarly, radar system 160 may be configured to provide accurate two and/or three dimensional aggregation and/or display of a series of radar data; without either orientation data or position data to help determine a track or heading, a radar system typically assumes a straight track, which can cause image artifacts and/or other inaccuracies in corresponding radar data and/or imagery. Additionally, when implemented with a position sensor, radar system 160 may be configured to generate accurate and detailed intensity plots of objects on a surface of a body of water without access to a magnetometer.

In embodiments where radar system 160 is implemented with an orientation and/or position sensor, radar system 160 may be configured to store such location/position information along with other sensor information (radar returns, temperature measurements, text descriptions, altitude, mobile structure speed, and/or other sensor and/or control information) available to system 100. In some embodiments, controller 130 may be configured to generate a look up table so that a user can select desired configurations of radar system 160 for a particular location or to coordinate with some other sensor information. Alternatively, an automated adjustment algorithm can be used to select optimum configurations based on the sensor information.

For example, in one embodiment, mobile structure 101 may be located in an area identified on an chart using position data, a user may have selected a user setting for a configuration of radar system 160, and controller 130 may be configured to control an actuator and/or otherwise implement the configuration for radar system 160 (e.g., to set a particular orientation or rotation rate). In still another embodiment, controller 130 may be configured to receive orientation measurements for mobile structure 101. In such embodiment, controller 130 may be configured to control the actuators associated with the radar assembly to maintain its orientation relative to, for example, the mobile structure and/or the water surface, and thus improve the displayed sonar images (e.g., by ensuring consistently oriented radar beams and/or proper registration of a series of radar returns). In various embodiments, controller 130 may be configured to control steering sensor/actuator 150 and/or propulsion system 170 to adjust a position and/or orientation of mobile structure 101 to help ensure proper registration of a series of radar returns, radar data, and/or radar imagery.

Although FIG. 1A shows various sensors and/or other components of system 100 separate from radar system 160, in other embodiments, any one or combination of sensors and components of system 100 may be integrated with a radar assembly, an actuator, a transducer module, and/or other components of radar system 160. For example, OPS 190 may be integrated with an antenna platform of sonar system 110 and be configured to provide measurements of an absolute and/or relative orientation (e.g., a roll, pitch, and/or yaw) of the antenna to controller 130 and/or user interface 120, both of which may also be integrated with radar system 160.

User interface 120 may be implemented as a display, a touch screen, a keyboard, a mouse, a joystick, a knob, a steering wheel, a ship's wheel or helm, a yoke, and/or any other device capable of accepting user input and/or providing feedback to a user. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101. In such embodiment, user interface 120 may be adapted to process the sensor signals to determine sensor information indicating an estimated and/or absolute roll, pitch, and/or yaw (attitude and/or rate), and/or a position or series of positions of sonar system 110, radar system 160, and/or mobile structure 101, for example, and display the sensor information as feedback to a user. In one embodiment, user interface 120 may be adapted to display a time series of various sensor information and/or other parameters as part of or overlaid on a graph or map, which may be referenced to a position and/or orientation of mobile structure 101. For example, user interface 120 may be adapted to display a time series of positions, headings, and/or orientations of mobile structure 101 and/or other elements of system 100 (e.g., a transducer assembly and/or module of sonar system 110, or an antenna or radar assembly of radar system 160) overlaid on a geographical map, which may include one or more graphs indicating a corresponding time series of actuator control signals, sensor information, and/or other sensor and/or control signals, including sonar and/or radar image data.

In some embodiments, user interface 120 may be adapted to accept user input including a user-defined target heading, route (e.g., track for radar system 160), and/or orientation for a transducer module, for example, and to generate control signals for steering sensor/actuator 150 and/or propulsion system 170 to cause mobile structure 101 to move according to the target heading, route, and/or orientation. In further embodiments, user interface 120 may be adapted to accept user input including a user-defined target attitude/absolute angular frequency for an actuated device (e.g., sonar system 110, radar system 160) coupled to mobile structure 101, for example, and to generate control signals for adjusting an orientation or rotation of the actuated device according to the target attitude/angular frequency. More generally, user interface 120 may be adapted to display sensor information to a user, for example, and/or to transmit sensor information and/or user input to other user interfaces, sensors, or controllers of system 100, for instance, for display and/or further processing. In one embodiment, user interface 120 may be integrated with one or more sensors (e.g., imaging modules, position and/or orientation sensors, other sensors) and/or be portable (e.g., such as a portable touch display or smart phone, for example, or a wearable user interface) to facilitate user interaction with various systems of mobile structure 101.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, radar system 160, steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of sonar system 110, radar system 160, mobile structure 101, and/or system 100.

OPS 190 may be implemented as an integrated selection of orientation and/or position sensors (e.g., orientation sensor 140, accelerometer/gyroscope 144, GPS 146) that is configured to provide orientation and/or position data in relation to one or more elements of system 100. For example, embodiments of OPS 190 may be integrated with mobile structure 101, sonar system 110, and/or radar system 160 and be configured to provide orientation and/or position data corresponding to a center of mass of mobile structure 101, a sonar transducer of sonar system 110, and/or a radar antenna of radar system 160. Such measurements may be referenced to an absolute coordinate frame, for example, or may be referenced to a coordinate frame of OPS 190 and/or any one of the individual sensors integrated with OPS 190. More generally, OPS 190 provides a single, relatively compact integrated device that can be replicated throughout various elements of system 100, which in some embodiments may include a single/simplified interface for data and/or power. In various embodiments, the coordinate frames for one or more of the orientation and/or position sensors integrated into OPS 190 may be referenced to each other (e.g., to a single coordinate frame for OPS 190), such as at time of manufacture, to reduce or eliminate a need to determine coordinate frame transformations to combine data from multiple sensors of OPS 190 during operation of system 100.

Orientation sensor 140 may be implemented as one or more of a compass, float, accelerometer, magnetometer, and/or other digital or analog device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example. In various embodiments, orientation sensor 140 may be implemented and/or operated according to any of the systems and methods described in International Application PCT/US14/38286 filed May 15, 2014 and entitled "AUTOMATIC COMPASS CALIBRATION SYSTEMS AND METHODS", which is hereby incorporated by reference in its entirety.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GPS 146 may be implemented as a global positioning satellite receiver and/or other device capable of determining absolute and/or relative position of mobile structure 101 (e.g., or an element of mobile structure 101, such as sonar system 110 radar system 160, and/or user interface 120) based on wireless signals received from space-born and/or terrestrial sources, for example, and capable of providing such measurements as sensor signals that may be communicated to various devices of system 100. More generally, GPS 146 may be implemented to any one or combination of a number of different GNSSs. In some embodiments, GPS 146 may be used to determine a velocity, speed, COG, SOG, track, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering or trim mechanism) of mobile structure 101, and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example.

In other embodiments, other modules 180 may include one or more actuated devices (e.g., spotlights, infrared illuminators, cameras, radars, sonars, lidars, other ranging systems, and/or other actuated devices) coupled to mobile structure 101, where each actuated device includes one or more actuators adapted to adjust an orientation of the device, relative to mobile structure 101, in response to one or more control signals (e.g., provided by controller 130). Other modules 180 may include a sensing element angle sensor, for example, which may be physically coupled to a radar assembly housing of radar system 160 and be configured to measure an angle between an orientation of an antenna/sensing element and a longitudinal axis of the housing and/or mobile structure 101. Other modules 180 may also include a rotating antenna platform and/or corresponding platform actuator for radar system 160. In some embodiments, other modules 180 may include one or more Helmholtz coils integrated with OPS 190, for example, and be configured to selectively cancel out one or more components of the Earth's magnetic field.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 and/or sonar system 110 from various sensors, to determine a transducer orientation adjustment (e.g., relative to a desired transducer orientation) from the sensor signals, and/or to control an actuator to adjust a transducer orientation accordingly, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

For example, the same or similar components may be used to create an acoustic pulse (e.g., a transmission control signal and/or a digital shaping control signal), convert the acoustic pulse to an excitation signal (e.g., a shaped or unshaped transmission signal) and transmit it to a sonar transducer element to produce an acoustic beam, receive an acoustic return (e.g., a sound wave received by the sonar transducer element and/or corresponding electrical signals from the sonar transducer element), convert the acoustic return to acoustic return data, and/or store sensor information, configuration data, and/or other data corresponding to operation of a sonar system, as described herein. Similarly, the same or similar components may be used to create a radar pulse (e.g., a transmission control signal and/or a digital shaping control signal), convert the radar pulse to an excitation signal (e.g., a shaped or unshaped transmission signal) and transmit it to a radar antenna to produce a radar beam, receive a radar return (e.g., an electromagnetic wave received by the radar antenna and/or corresponding electrical signals from the radar antenna), convert the radar return to radar return data, and/or store sensor information, configuration data, and/or other data corresponding to operation of a radar system, as described herein.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144, user interface 120, and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110, radar system 160, and/or other sensors of system 100 to/from a coordinate frame of orientation sensor 140 and/or mobile structure 101, for example. Furthermore, such parameters may be used to determine and/or calculate one or more adjustments to an orientation of sonar system 110 and/or radar system 160 that would be necessary to physically align a coordinate frame of sonar system 110 and/or radar system 160 with a coordinate frame of orientation sensor 140 and/or mobile structure 101, for example, or an absolute coordinate frame. Adjustments determined from such parameters may be used to selectively power adjustment servos/actuators (e.g., of sonar system 110, radar system 160, and/or other sensors or elements of system 100), for example, or may be communicated to a user through user interface 120, as described herein.

Figure 1B:
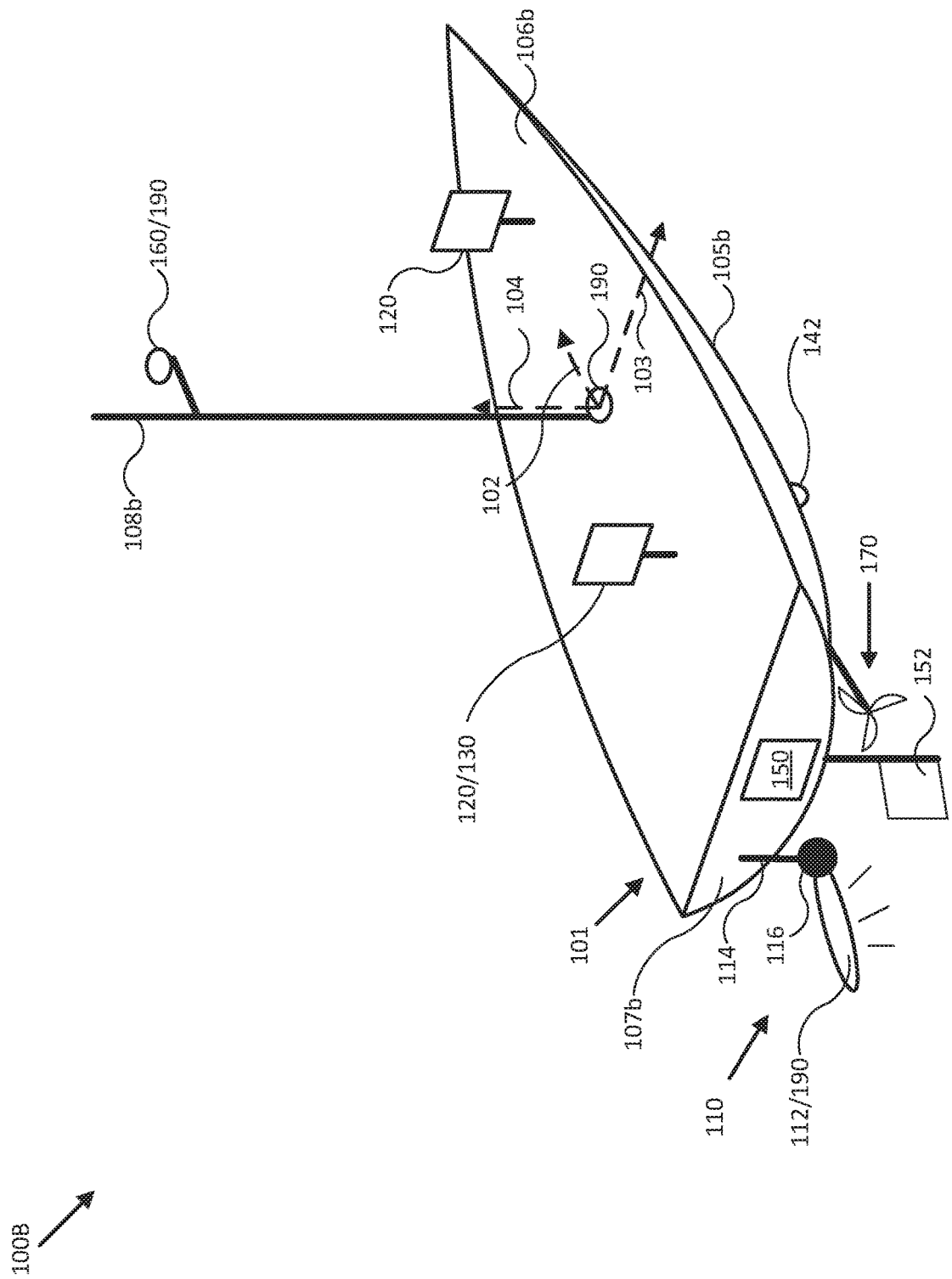
FIG. 1B illustrates a diagram of a remote sensing imagery system in accordance with an embodiment of the disclosure.

FIG. 1B illustrates a diagram of system 100B in accordance with an embodiment of the disclosure. In the embodiment shown in FIG. 1B, system 100B may be implemented to provide sonar and/or radar data and/or imagery for use with operation of mobile structure 101, similar to system 100 of FIG. 1A. For example, system 100B may include sonar system/OPS 110/190, radar system/OPS 160/190, integrated user interface/controller 120/130, secondary user interface 120, steering sensor/actuator 150, sensor cluster/

OPS 190 (e.g., orientation sensor 140, gyroscope/accelerometer 144, and/or GPS 146), and various other sensors and/or actuators. In the embodiment illustrated by FIG. 1B, mobile structure 101 is implemented as a motorized boat including a hull 105b, a deck 106b, a transom 107b, radar system/OPS 160/190 coupled to mast/sensor mount 108b, a rudder 152, an inboard motor 170, and an actuated sonar system 110 coupled to transom 107b. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes actuated sonar system 110, which in turn includes OPS 190 integrated with transducer assembly 112, which are coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. For example, user interface/controller 120/130 may be adapted to receive an orientation of transducer assembly 112 configured to ensonify a portion of surrounding water and/or a direction referenced to an absolute coordinate frame, and to adjust an orientation of transducer assembly 112 to retain ensonification of the position and/or direction in response to motion of mobile structure 101, using one or more orientations and/or positions of mobile structure 101 and/or other sensor information derived by executing various methods described herein.

In another embodiment, user interface/controller 120/130 may be configured to adjust an orientation of transducer assembly 112 to direct sonar transmissions from transducer assembly 112 substantially downwards and/or along an underwater track during motion of mobile structure 101. In such embodiment, the underwater track may be predetermined, for example, or may be determined based on criteria parameters, such as a minimum allowable depth, a maximum ensonified depth, a bathymetric route, and/or other criteria parameters. Transducer assembly 112 may be implemented with a sonar position and/or orientation sensor (SPOS), which may include one or more sensors corresponding to orientation sensor 140, gyroscope/accelerometer 144 and/or GPS 146, for example, that is configured to provide absolute and/or relative positions and/or orientations of transducer assembly 112 to facilitate actuated orientation of transducer assembly 112.

Also shown in FIG. 1B is radar system 160, which includes integrated OPS 190 and a radar antenna platform and actuator configured to rotate the radar antenna about a vertical axis substantially aligned with vertical axis 104 of mobile structure 101. In some embodiments, user interface/controller 120/130 may be configured to receive radar returns from a radar assembly of radar system/OPS 160/190, and corresponding orientation and/or position data from radar system/OPS 160/190 (e.g., corresponding to an orientation and/or position of an antenna of radar system 160 when the radar returns are received), and then generate radar image data based, at least in part, on the radar returns and the corresponding orientation and/or position data.

More generally, both sonar system 110 and radar system 160 are types of detection and ranging systems, each with remote sensing assemblies (e.g., sonar assemblies, radar assemblies) including housings adapted to be mounted to mobile structure 101, each with OPS disposed within their respective housings and adapted to measure an orientation and/or position of an associated sensing element (e.g., sonar transducer, radar antenna), and each having access to or integrated with a logic device (e.g., controller 130) configured to receive remote sensor returns from the corresponding remote sensing assembly and sensor return orientation and/or position data from the corresponding OPS and generate remote sensor image data based, at least in part, on the remote sensor returns and the sensor return orientation and/or position data. Once the remote sensor image data is received, user interface/controller 120/130 may be configured to render the remote sensor image data on a display of any one of user interface 120, for example. In some embodiments, multiple sets of remote sensor image data may be displayed on the same user interface using one or more geo-referenced, target references, and/or source references overlays.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 can stay substantially level with respect to a horizon and/or a "down" vector (e.g., to mimic typical user head motion/orientation), for example, or so the display can be oriented according to a user's desired view. In another embodiment, at least one of user interfaces 120 may be located in proximity to mobile structure 101 and be mobile/portable throughout a user level (e.g., deck 106b) of mobile structure 101. For example, a secondary user interface 120 may be implemented with a lanyard, strap, headband, and/or other type of user attachment device and be physically coupled to a user of mobile structure 101 so as to be in proximity to the user and mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160.

Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cells or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2:
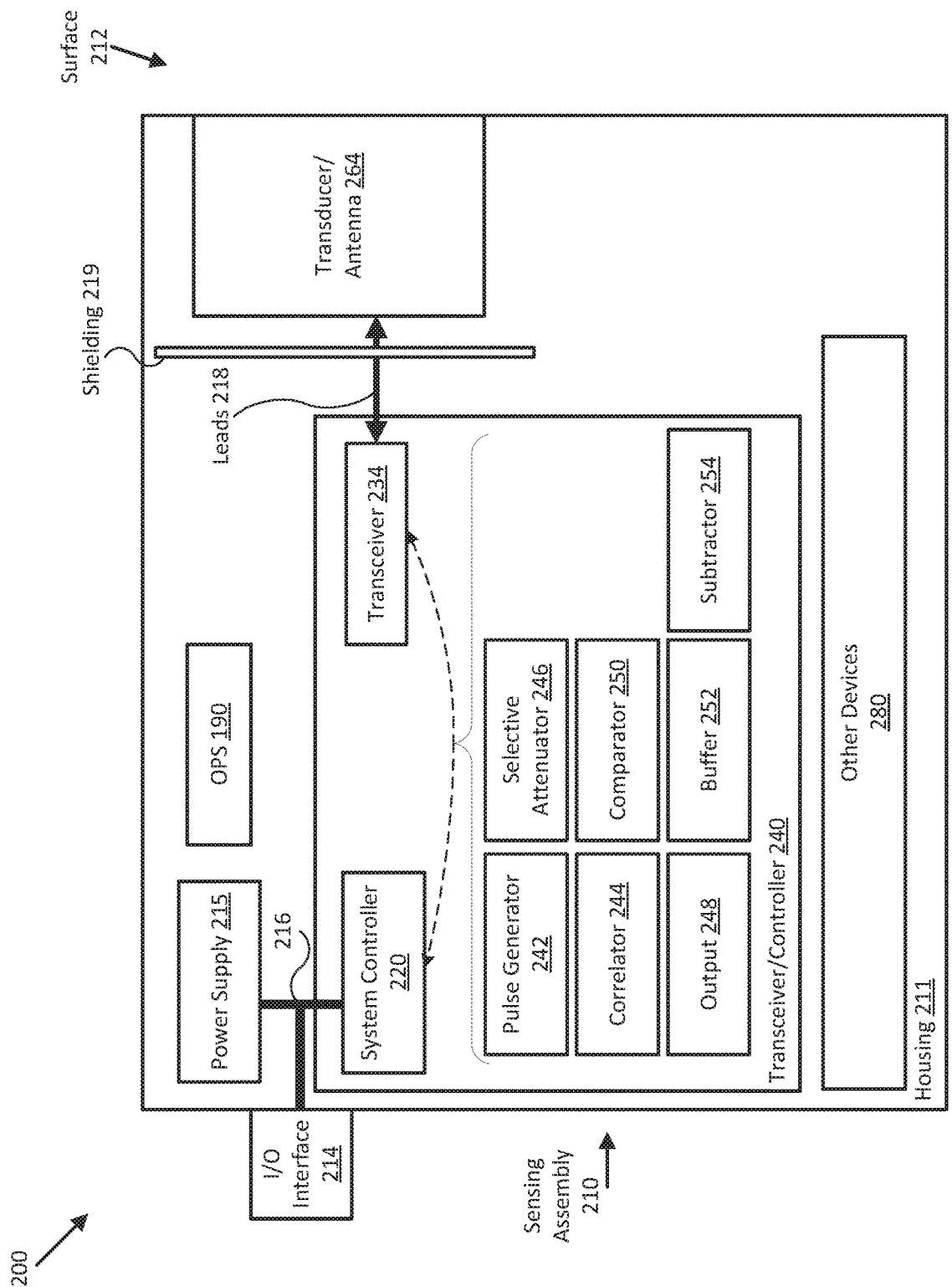
FIG. 2 illustrates a diagram of a remote sensing imagery system in accordance with an embodiment of the disclosure.

FIG. 2 illustrates a diagram of a detection and ranging system 200 in accordance with an embodiment of the disclosure. In the embodiment shown in FIG. 2, system 200 includes a remote sensing assembly 210 that can be coupled to a user interface (e.g., user interface 120 of FIG. 1A) and/or a power source through a single I/O cable 214. As shown, remote sensing assembly 210 may include one or more system controllers 220, sensing elements (e.g., transducer/antenna 264), OPS 190, and/or other devices facilitating operation of system 200 all disposed within a common housing 211. In other embodiments, one or more of the devices shown in FIG. 2 may be integrated with a remote user interface and communicate with remaining devices within remote sensing assembly 210 through one or more data and/or power cables similar to I/O cable 214.

Controller 220 may be implemented as any appropriate logic device (e.g., processing device, microcontroller, processor, digital signal processor (DSP), application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of remote sensing assembly 210 and/or system 200, for example, similar to controller 130. In typical embodiments, controller 220 may be tasked with overseeing general operation of remote sensing assembly 210, generating remote sensor image data from remote sensor returns and sensor return orientation and/or position data, correlating sensor data with remote sensor data/imagery, communicating operational parameters and/or sensor information with other devices through I/O cable 214, and/or other operations of system 200. Controller 220 may in some embodiments be implemented with relatively high resolution timing circuitry capable of generating digital transmission and/or sampling control signals for operating transmitters, receivers, transceivers, signal conditioners, and/or other devices of remote sensing assembly 210, for example, and other time critical operations of system 200, such as per-sample digital beamforming and/or interferometry operations applied to remote sensor returns from sensing element 264, as described herein. In some embodiments, controller 220 may be implemented in a distributed manner across a number of individual controllers.

Transceiver 234 may be implemented with one or more digital to analog converters (DACs), signal shaping circuits, filters, phase adjusters, signal conditioning elements, amplifiers, timing circuitry, logic devices, and/or other digital and/or analog electronics configured to accept digital control signals from controller 220 and to generate transmission signals to excite a transmission channel/element of remote sensing assembly 210 (e.g., sensing element 264, which in some embodiments can be used to transmit remote sensor beams and receive sensor returns) to produce one or more remote sensor beams. In some embodiments, various transmission operations of transceiver 234 (e.g., amplification, frequency dependent filtering, transmit signal frequency, duration, shape, and/or timing/triggering, and/or other signal attributes), may be controlled (e.g., through use of various control signals) by controller 220, as described herein.

Transceiver 243 may also be implemented with one or more analog to digital converters (ADCs), filters, phase adjusters, signal conditioning elements, amplifiers, timing circuitry, logic devices, and/or other digital and/or analog electronics configured to accept analog remote sensor returns from a corresponding receive channel/sensing element of remote sensing assembly 210 (e.g., sensing element 264), convert the analog remote sensor returns into digital remote sensor returns, and provide the digital sensor returns to controller 220. In some embodiments, various receive operations of transceiver 234 (e.g., amplification, frequency dependent filtering, basebanding, sample resolution, duration, and/or timing/triggering, and/or other ADC/signal attributes) may be controlled by controller 220.

For example, controller 220 may be configured to use transceiver 234 to convert a remote sensor return into a digital remote sensor return comprising one or more digital baseband transmissions that are then provided to controller 220. In some embodiments, transceiver 234 may be configured to low-pass or otherwise filter, amplify, decimate, and/or otherwise process the analog and/or digital remote sensor returns (e.g., using analog and/or digital signal processing) prior to providing the digital remote sensor returns to controller 220. In other embodiments, transceiver 234 may be configured to provide substantially unprocessed (e.g., raw) analog and/or digital remote sensor returns to controller 220 for further signal processing, as described herein. In further embodiments, transceiver 234 may be implemented as one or more separate transmitters and receivers.

Controller 220 and transceiver 234 shown in FIG. 2 may also be understood as belonging to a transceiver/controller 240 of system 200, according to some embodiments of the disclosure. In this regard, various subcomponents of transceiver/controller 240 may be implemented by utilizing a combination of controller 220 and transceiver 234. For example, according to one or more embodiments, a combination of controller 220 and transceiver 234 may be utilized to implement a pulse generator 242, a correlator 244, a selective attenuator 246, and/or an output 248 (e.g., an output circuit). As discussed above, circuits 242 through 248 may be implemented in any appropriate combination of hardwired components and/or logic devices (e.g., processing device, microcontroller, processor, digital signal processor (DSP), application specific integrated circuit (ASIC), field programmable gate array (FPGA), memory storage device, memory reader, or other device or combinations of devices) configured to execute, store, and/or receive appropriate instructions, such as software instructions. For example, all or part of correlator 244 and/or selective attenuator 246 may be implemented by a FPGA and/or by a DSP or other processing device configured to execute, store, and/or receive appropriate instructions.

As further discussed herein, circuits 242 through 248 may be configured to perform various operations to improve deconvolution of targets by selectively attenuating portions of a signal representing a return or echo from the targets so as to suppress undesirable portions of the signal. For example, pulse generator 242 may be configured to generate a pulse (e.g., a pulse having a radio frequency or audio frequency wave as a carrier) to be transmitted toward a target. In some embodiments, pulse generator 242 may also be configured to shape a pulse envelope and/or to modulate the frequency or the phase of the carrier wave within the pulse to perform pulse compression.

Correlator 244 may be configured to determine a correlated return signal based on a return signal (e.g., representing a portion of the transmitted pulse reflected from a target) and the transmitted pulse. In some embodiments, correlator 244 may be configured to determine the correlated return signal at least by determining (e.g., calculating, computing) a cross-correlation between the return signal and the pulse (e.g., a replica of the pulse). Selective attenuator 246 may be configured to compare the correlated return signal against one or more bounds that are determined relative to the return signal and attenuate those portions of the correlated return signal that fall outside of the one or more bounds. In some embodiments, the one or more bounds may include a lower bound that is based on a scaled version of the received return signal. In some embodiments, the one or more bounds may also include an upper bound that is based on another scaled version of the received return signal. In other embodiments, selective attenuator 246 may be configured to attenuate sensor returns based on a gradient of the sensor returns and/or a gradient limit for a corresponding ranging system.

Comparator 250 may be configured to compare values (e.g., numerical values, voltage, other electrical characteristics, and/or other values) and provide an output based on the comparison. For example, comparator 250 may be configured to compare a gradient between two return signal amplitudes to a gradient limit for a ranging system and output a digital signal, Boolean value, and/or other signal configured to indicate a result of the comparison. Buffer 252 may be one or more flip flops and/or other structures and/or memory locations configured to store values, such as return signal amplitudes and/or intermediate calculated values, for example, and may in some embodiments be configured to form one or more circular buffers. Subtractor 254 may be configured to determine a difference between input values, for example, and provide the difference as an output. Output 248 may be configured to provide the selectively attenuated correlated signal as an output signal for further processing (e.g., video signal processing) and/or rendering remote sensing imagery (e.g., a radar or sonar image) on a display.

In the embodiment shown in FIG. 2, sensing element 264 is implemented as a single transmission/receive channel that may be configured to transmit remote sensor beams and receive remote sensor returns through emission surface 212 of housing 211. In some embodiments, remote sending assembly 210 may be implemented with multiple transmission and/or receive channels (e.g., a multichannel sonar transducer, or a multichannel/synthetic aperture radar antenna). In general, remote sending assembly 210 may be implemented with one, two, or many separate elements configured to produce one or more remote sensor beams, and one, two, or many separate sensing elements configured to receive remote sensor returns. The effective volumetric shapes of the remote sensor beams and remote sensor returns may be determined by the shapes and arrangements of their corresponding transducer elements. In multichannel embodiments, the various channels may be arranged to facilitate multichannel processing, such as beamforming, interferometry, inter-beam interpolation, and/or other types of multichannel processing used to produce remote sensor data and/or imagery.

In FIG. 2, sensing element 264 is coupled to its electronics over leads 218 and through shielding 219. In various embodiments, leads 218 and/or shielding 219 may be implemented as one or more shielded transmission lines configured to convey analog and/or digital signals between the various elements while shielding transceiver 234 and sensing element 264 from electromagnetic interference from each other, other elements of remote sensing assembly 210 (e.g., OPS 190), and/or external sources. In some embodiments, leads 218 and shielding 219 may be integrated together to form a transmission system. For example, shielding 219 may be configured to provide a ground plane/return for signals conveyed by leads 218.

As shown, remote sensing assembly 210 may be implemented with OPS 190, which may be configured to measure a relative and/or absolute orientation and/or position of remote sensing assembly 210 and/or sensing element 264 and provide such measurements to controller 220. In some embodiments, controller 220 may be configured to combine remote sensor data and/or imagery according to such measurements and/or measurements of an orientation and/or position of a coupled mobile structure to produce combined remote sensor data and/or imagery, such as multiple co-registered remote sensor images, for example, and/or three dimensional remote sensor imagery. In other embodiments, controller 220 may be configured to use orientation and/or position measurements of remote sensing assembly 210 and/or a coupled mobile structure to control one or more actuators (e.g., other devices 280) to adjust a position and/or orientation of remote sensing assembly 210 and/or sensing element 264 and emit remote sensor beams towards a particular position and/or orientation, for example, or otherwise control motion of remote sensing assembly 210 and/or sensing element 264.

Other devices 280 may include other and/or additional sensors, sensor arrays, actuators, logic devices, communications modules/nodes, power distribution components, and/or user interface devices used to provide additional environmental information and/or configuration parameters, for example, and/or to adjust a position and/or orientation of remote sensing assembly 210 and/or sensing element 264. In some embodiments, other devices 280 may include a visible spectrum camera, an infrared camera, and/or other environmental sensors providing measurements and/or other sensor signals that can be displayed to a user and/or used by other devices of remote sensing assembly 210 (e.g., controller 220) to provide operational control of remote sensing assembly 210. In some embodiments, other devices 280 may include one or more actuators adapted to adjust an orientation (e.g., roll, pitch, and/or yaw) and/or a position (longitudinal, lateral, and/or vertical) of remote sensing assembly 210 and/or sensing element 264 relative to a coupled mobile structure, in response to one or more control signals (e.g., provided by controller 220). In other embodiments, other devices 280 may include one or more brackets, such as a transom bracket or a mast bracket, adapted to couple housing 211 to a mobile structure.

Other devices 280 may also include a sensing element angle sensor, for example, which may be physically coupled to housing 211 of remote sensing assembly 210 and be configured to measure an angle between an orientation of sensing element 264 and a longitudinal axis of housing 211 and/or mobile structure 101. Other devices 280 may also include a rotating platform and/or corresponding platform actuator for sensing element 264 and/or remote sensing assembly 210. In some embodiments, other devices 280 may include one or more Helmholtz coils integrated with OPS 190, for example, and be configured to selectively cancel out one or more components of the Earth's magnetic field, as described herein.

In various embodiments, remote sensing assembly 210 may be implemented in a single housing 211 with a single interface (e.g., I/O cable 214) to simplify installation and use. For example, I/O cable 214 may be implemented as a power-over-Ethernet (POE) cable supporting transmission of both communications and power between remote sensing assembly 210 and elements of a coupled mobile structure. Such communications and/or power may be delivered over leads 216 to power supply 215 and/or controller 220. Power supply 215 may be implemented as one or more power conditioners, line filters, switching power supplies, DC to DC converters, voltage regulators, power storage devices (e.g., batteries), and/or other power supply devices configured to receive power over leads 216 and/or distribute power to the various other elements of remote sensing assembly 210.

Turning now to FIGS. 3 through 7F, techniques to improve deconvolution of targets in a detection and ranging system (e.g., radar, sonar, lidar, or other active detection and ranging system) will now be described in accordance with embodiments of the disclosure. The techniques to improve deconvolution of targets according to one or more embodiments of the disclosure may selectively attenuate (e.g., selectively reduce or remove) portions of a signal representing a return or echo from the targets so as to suppress (e.g., reduce or remove) undesirable portions of the signal. For example, side lobes in a correlated return signal (e.g., side lobes appearing due to pulse compression of the transmitted pulse), interference, distortion (e.g., due to clipping), artifacts, or otherwise weakly correlated portions of a return signal may beneficially be suppressed by the selective attenuation according to one or more embodiments of the disclosure.

Figure 3:
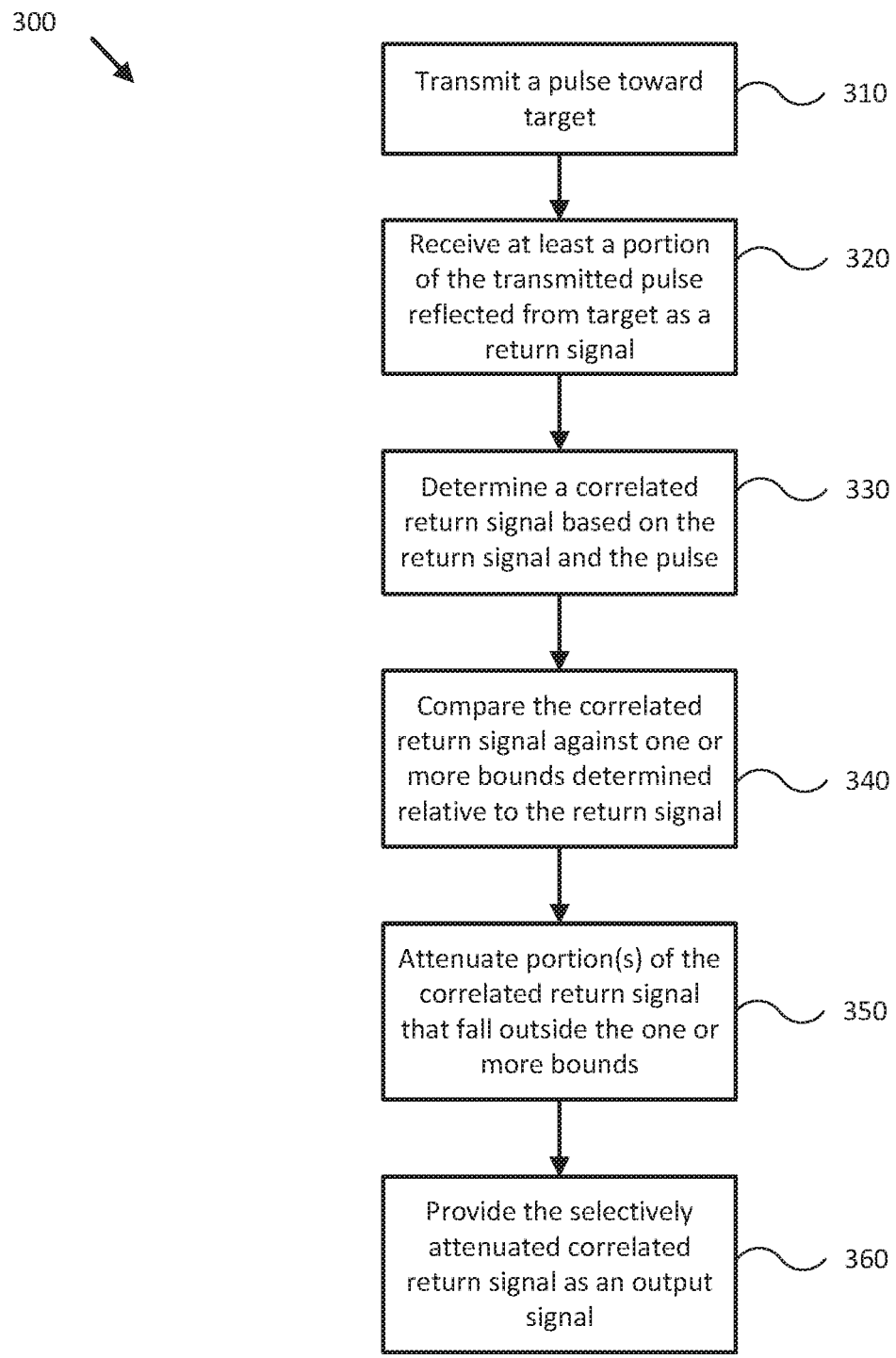
FIG. 3 illustrates a flow diagram of various operations to provide target deconvolution in accordance with an embodiment of the disclosure.

FIG. 3 illustrates a flowchart of a process 300 for improved deconvolution of targets in a detection and ranging system (e.g., detection and ranging system 100 or 200) according to one or more embodiments of the disclosure. In some embodiments, the operations of FIG. 3 may be implemented as software instructions executed by one or more logic devices associated with corresponding electronic devices, sensors, and/or structures depicted in FIGS. 1A through 2. More generally, the operations of FIG. 3 may be implemented with any combination of software instructions and/or electronic hardware (e.g., inductors, capacitors, amplifiers, actuators, or other analog and/or digital components).

It should also be appreciated that any step, sub-step, sub-process, or block of process 300 may be performed in an order or arrangement different from the embodiments illustrated by FIG. 3. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 300 is described with reference to systems described in FIGS. 1A-2, process 300 may be performed by other systems different from those systems and including a different selection of electronic devices, sensors, assemblies, mobile structures, and/or mobile structure attributes.

Figure 4A:
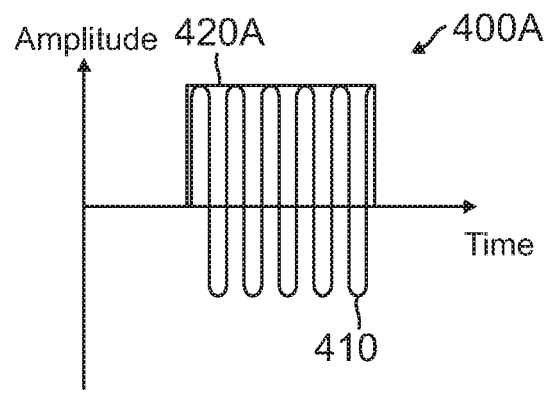
FIGS. 4A and 4D illustrate pulses that may be generated and transmitted in accordance with various embodiments of the disclosure.
Figure 4B:
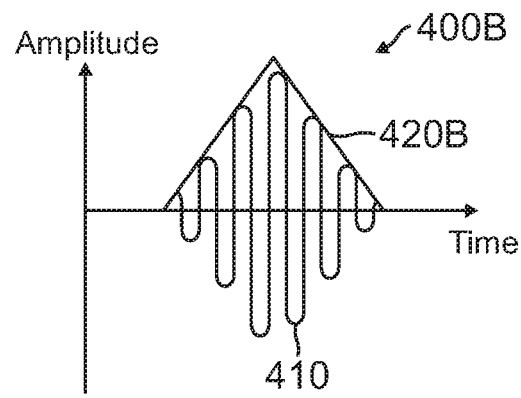
Figure 4C:
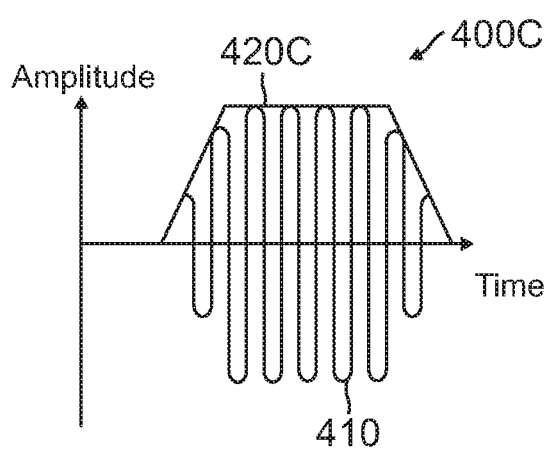
Figure 4D:
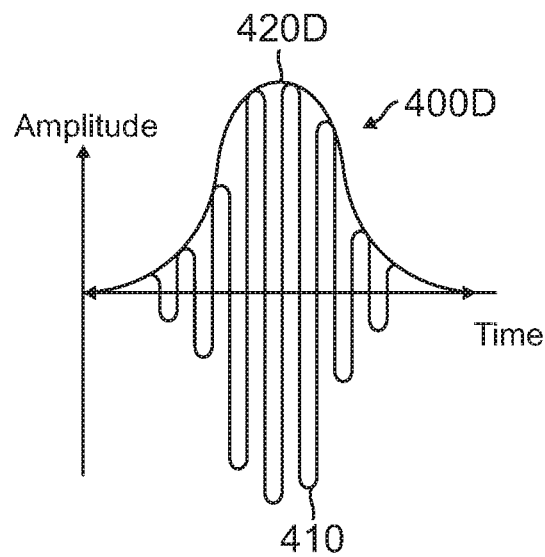

At block 310, a pulse is transmitted toward a target. For example, a pulse may be generated by pulse generator 242 of transceiver/controller 240 in detection and ranging system 200, and transmitted toward a target by transducer/antenna 264. In various embodiments, the pulse may be a pulse having a carrier wave (e.g., a radio frequency wave for radar system 160 or an audio frequency wave for sonar system 110). In such embodiments, the carrier wave may be pulse-modulated according to a pulse envelope, such that the amplitude of the carrier wave is bound by the pulse envelope. A pulse having a carrier wave that may be generated and transmitted according to various embodiments of the disclosure is illustrated with reference to FIGS. 4A-4B. For example, FIG. 4A illustrates a pulse 400A having a carrier wave 410 that may be transmitted at block 310 according an embodiment of the disclosure. Here, carrier wave 410 is pulse-modulated according to a pulse envelope 420A. Pulse envelope 420A has a rectangular shape, and thus may also be referred to as a rectangular envelope 420A. FIGS. 4B through 4D illustrate pulses 400B, 400C, and 400D having carrier waves 410 that are pulse-modulated according to a triangular envelope 420B, a trapezoidal envelope 420C, and a Gaussian envelope 420D (e.g., following a Gaussian, or normal, distribution), respectively, in accordance with various embodiments of the disclosure.

The transmitting of the pulse at block 310, according to some embodiments, may also involve performing a pulse compression process (e.g., at pulse generator 242), which beneficially allows longer pulses to be transmitted that provide an increased range resolution comparable to using shorter pulses but without the high peak power requirement of shorter pulses. For example, a pulse compression process may include modulating the frequency or the phase of the carrier wave (e.g., carrier wave 410) to transmit the pulse and correlating a return signal (e.g., an echo representing at least a portion of the transmitted pulse reflected from a target) with a replica of the transmitted pulse, such that the resulting correlated return signal may in effect represent a compressed version of the return signal.

Figure 5A:
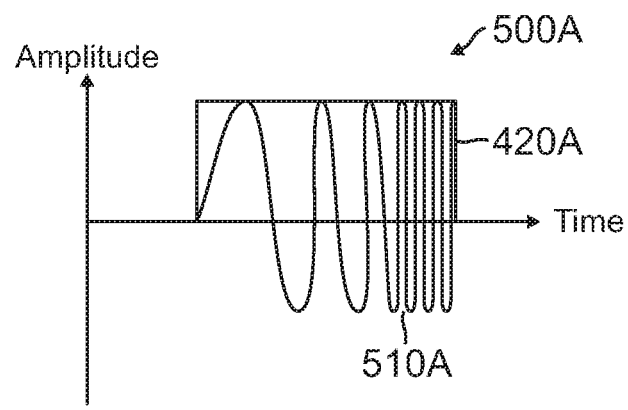
FIGS. 5A and 5B illustrate pulses that may be generated and transmitted in accordance with various embodiments of the disclosure.
Figure 5B:
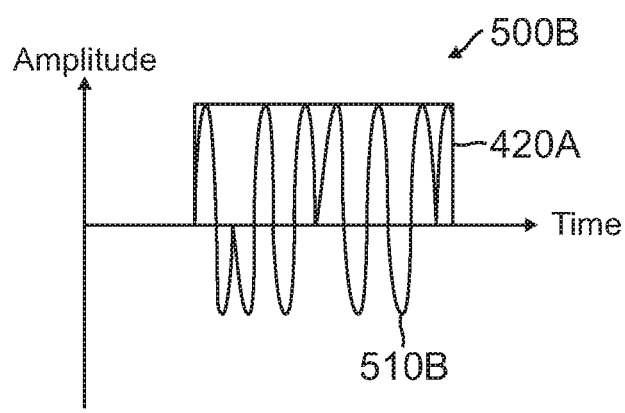

FIGS. 5A and 5B illustrate example pulses 500A and 500B that may be generated and transmitted at block 310 with a pulse compression process performed, in accordance with embodiments of the disclosure. In the non-limiting example pulse 500A of FIG. 5A, the carrier wave 510A is frequency-modulated to increase the frequency linearly as a function of time. Such frequency modulation may also be referred to as linear frequency modulation (LFM). However, in other examples according to embodiments of the disclosure, the frequency of the carrier wave may be decreased and/or increased, and/or the modulation of the frequency may be non-linear with respect to time. In the non-limiting example pulse 500B of FIG. 5B, the carrier wave 510B is phase-modulated to switch the phase according to binary codes such as Barker codes or other appropriate codes. Such phase modulation may also be referred to as phase-code modulation or pulse-code modulation.

Figure 6A:
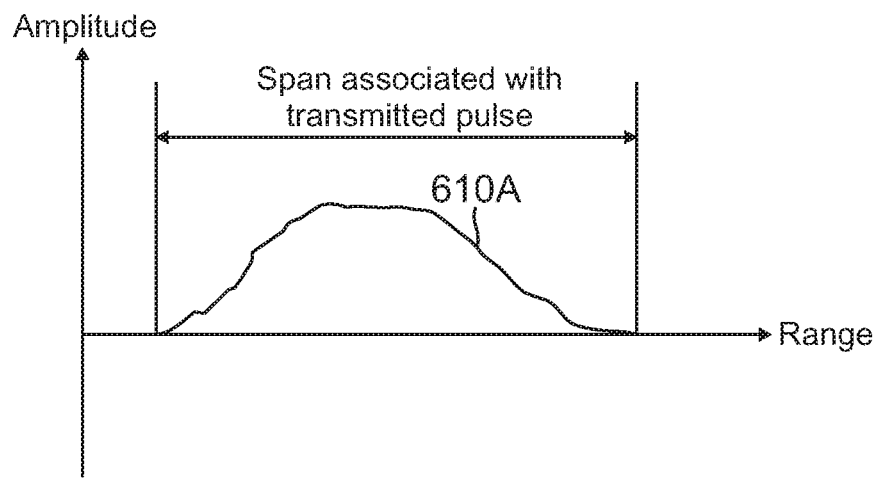
FIG. 6A illustrates a return signal in accordance with various embodiments of the disclosure.
Figure 6B:
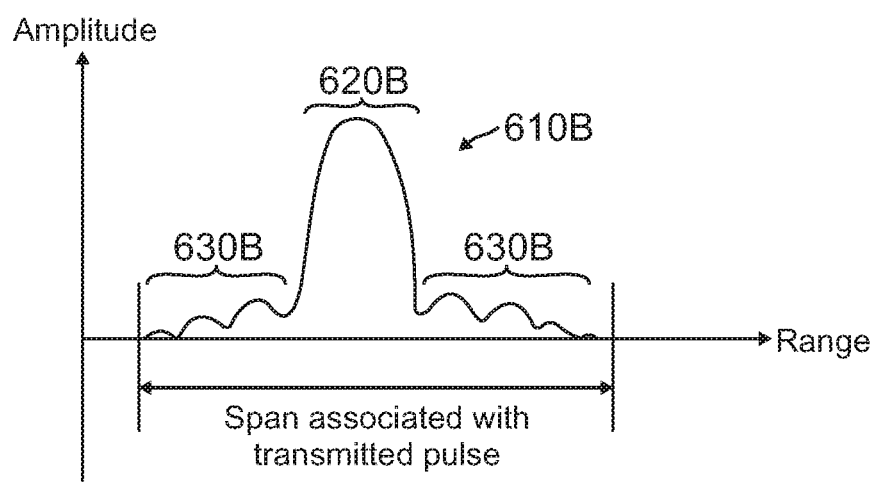
FIG. 6B illustrates a correlated return signal in accordance with various embodiments of the disclosure.

As discussed above, a correlated return signal obtained by correlating a return signal (e.g., an echo) representing at least a portion of the transmitted pulse reflected from a target) with a replica of the frequency-modulated or phase-modulated transmitted pulse such as pulse 500A or 500B can provide an improve range resolution of target ranging. FIGS. 6A and 6B illustrate such compression effect in accordance with an embodiment of the disclosure. FIG. 6A shows an example of a return signal 610A reflected from a single target (e.g., modeled as a unit impulse target) prior to correlating with a replica of the transmitted frequency-modulated or phase-modulated pulse. The example return signal 610A spans at least the width (e.g., range) associated with the transmitted pulse, and thus may be unable to resolve any other target or features of the target within the span. FIG. 6B shows an example of a correlated return signal 610B obtained by correlating return signal 610A with a replica of the transmitted frequency-modulated or phase-modulated pulse. The example correlated return signal 610B shows a narrower and more prominent main peak 620B, which may be used as an indication of a range to the target. By detecting a range to the target using the narrower and more prominent main peak 620B, range resolution may effectively be increased.

The example correlated return signal 610B also has side lobes 630B, which are less prominent (e.g., at a reduced amplitude) than main lobe 620B but span at least the width associated with the transmitted pulse. While conventional amplitude and/or frequency shaping techniques at the transmit and/or receive side may be utilized to reduce the amplitude of side lobes 630B to some extent, conventional amplitude and/or frequency shaping techniques can fail to reduce the side lobes 630B to a desirable extent, especially when there are distortion (e.g., due to clipping of signals that exceed the dynamic range of the detection and ranging system) and/or interference (e.g., from similar detection and ranging systems), such that the target may appear to have a larger range extent (e.g., because side lobes 630B are also interpreted/displayed as representing the target). As further discussed herein, process 300 for improved deconvolution of targets according to various embodiments of the disclosure may beneficially provide improved suppression of such side lobes, even when distortion and interference may be present.

Returning to FIG. 3, at block 320, at least a portion of the transmitted pulse reflected from a target may be received. For example, at least a portion of the transmitted pulse that is reflected from a target may be received (e.g., picked up) by transducer/antenna 264 of detection and ranging system 200 and passed to transceiver/controller 240 to be received as a return signal.

At block 330, a correlated return signal is determined based on the return signal and the pulse. As discussed above, the return signal may be correlated with a replica of the transmitted pulse (e.g., a substantially same signal as the transmitted pulse) to determine the correlated return signal, for example, by correlator 244 of transceiver/controller 240. In some embodiments, a correlated return signal may be determined at least by determining (e.g., calculating, computing) a cross-correlation between the return signal and the pulse (e.g., a replica of the pulse). For example, a correlated return signal y[n] may be determined by determining a cross-correlation between the return signal and the pulse as follows, where * represents a convolution operator, u represents the received return signal, f represents a complex conjugate of the transmitted pulse, and n represents the sampled points:

$$y[n](f^*u)[n] \quad \text{(Equation 1)}.$$

At block 340, the correlated return signal is compared against one or more bounds that are determined relative to the return signal, and at block 350, those portions of the correlated return signal that fall outside of the one or more bounds are attenuated. The comparison and the selective attenuation of blocks 340 and 350 may be performed by selective attenuator 246 of transceiver/controller 240, for example.

In some embodiments, the one or more bounds may include a lower bound that is based on a scaled version of the received return signal. In some embodiments, the one or more bounds may also include an upper bound that is based on another scaled version of the received return signal. For example, a lower bound may be determined as the magnitude of the received return signal scaled by a first weight, and an upper bound may be determined as the magnitude of the return signal scaled by a second weight. Specifically, for example, the lower bound may be represented as $w_1|u[n-mu]|$, and the upper bound may be represented as $w_2|u[n-m]|$, where $w_1$ and $w_2$ represent the first and the second weights, respectively, and where m represents an offset to align the sampled points after the correlating if needed (e.g., to account for a delay caused by calculation to obtain a cross-correlation).

In one or more embodiments, the first and the second weights (e.g., $w_1$ and $w_2$) may be determined based on the energy in the transmitted pulse (e.g., a replica of the transmitted pulse). In one specific example according to such embodiments, $w_1$ and $w_2$ may be determined as follows:

$$w_1 = f_{max} + k_1(\gamma - f_{max})\frac{(M-1)}{M}, \quad \text{(Equation 2)}$$

$$w_2 = k_2\gamma. \quad \text{(Equation 3)}$$

where $f_{max}=\max(|f|)$, and where M represents the number of samples in the pulse f, and where $\gamma$ may be determined as follows:

$$\gamma = \frac{\sum |f[n]|^2}{f_{max}}. \quad \text{(Equation 4)}$$

Thus, in this example, the first and the second weights $w_1$ and $w_2$ are determined based on $\gamma$, which represents a normalized energy in the pulse f with a factor $1/f_{max}$ that accounts for the shape of the pulse envelope. According to embodiments of the disclosure, the energy in the pulse (e.g., as represented by $\gamma$ in one example) is indicative of the amplitude of a perfectly correlated signal (e.g., a perfectly correlated sample in the correlated return signal), which can beneficially be used as a reference point based on which the lower and the upper bounds should be set for the selective attenuation. In this regard, the weights $w_1$ and $w_2$, by which the return signal is scaled to be set as the lower and the upper bounds, respectively, are in some embodiments determined based on the energy in the pulse (e.g., as represented by $\gamma$).

The coefficients $k_1$ and $k_2$ allow for further adjustment of the weights $w_1$ and $w_2$ used to scale the return signal to determine the lower and the upper bounds. Generally for various embodiments, the coefficients $k_1$ and $k_2$ are determined such that $0 \leq k_1 \leq 1$ and $k_2 > 1$. For example, by setting $k_2$ to be larger than 1, portions of the correlated signal with amplitude larger than that of a perfectly correlated sample for a unit impulse target would fall outside the upper bound and be attenuated. In some embodiments, to account for targets having larger sizes/extent that would correspondingly produce larger amplitude in the correlated return signal, $k_2$ may be set to be much larger than 1 (i.e., $k_2 \gg 1$). In this regard, $k_2$ may be determined based on the maximum target size and the range extent for a particular detection and ranging system, according to some embodiments. For example, $k_2$ may be determined based on the number of range samples and the number of samples for the maximum target size. In some embodiments, the coefficients $k_1$ and/or $k_2$ may be determined automatically by preprocessing and/or by a feedback process. For example, the return signal may be preprocessed to identify and determine the extent of the largest target (e.g., number of samples corresponding to the largest target) in the environment, and set $k_2$ dynamically and periodically based on the largest target in the environment. In other embodiments, the coefficients $k_1$ and/or $k_2$ may be determined empirically (e.g., to provide various pre-settings for different environments) and/or set based on a user input. In one specific embodiment, $k_1$ may be set to have a maximum value of approximately 0.5.

The correlated return signal may then be compared against the one or more bounds that are determined as discussed above, and those portions of the correlated return signal that fall outside of the one or more bounds may be attenuated. Using the example lower and upper bounds of $w_1|u[n-m]|$ and $w_2|u[n-m]|$ given above, such selective attenuation of the correlated return signal may be also be expressed as follows:

$$z[n] = \begin{cases} y[n], & \text{if } w_1|u[n-m]| \le |y[n]| < w_2|u[n+m]|, \\ w_3 y[n], & \text{otherwise} \end{cases} \quad \text{(Equation 5)}$$

where $z[n]$ represents the selectively attenuated correlated return signal, and where $0 \le w_3 < 1$ and represents a weight by which those portions of the correlated return signal $y[n]$ outside the lower and the upper bounds are attenuated. In other words, a sampled point of the correlated return signal $y[n]$ passes unattenuated to be output as a point in $z[n]$ if the sampled point has a magnitude larger or equal to the lower bound and smaller than the upper bound, whereas an attenuated version $w_3 y[n]$ is output as a point in $z[n]$ if the magnitude of the sampled point is outside those bounds.

In one embodiment, the weight $w_3$ may be set to zero to completely remove the out-of-bound portions correlated return signal, which may be very effective at removing those portions of the correlated return signal that are affected by interfering signals. In some embodiments, the weight $w_3$ may be set to a small value but not zero, such as 0.01 or a value between 0.001 and 0.1 inclusive, so that those weakly correlated portions (e.g., those that are below the lower bound and/or corresponding to side lobes) of the correlated signal may effectively be suppressed (e.g., attenuated below a threshold for displaying or indicating as belonging to the target), while at the same time allowing some distorted portions of the signals, such as those representing the target range but having a large amplitude above the upper bound due to the size of the target and/or due to signal distortion, to be attenuated to a useable level for displaying or detecting as the target range. In some embodiments, the weight $w_3$ may be set based on a user input and/or adjusted or determined automatically, for example, by a feedback process.

Through such selective attenuation based on a comparison of the correlated return signal against one or more bounds that are scaled versions of the return signal as discussed above for various embodiments, those portions of the correlated return signal that are weakly correlated may effectively be suppressed (e.g., reduced or removed). For example, range side lobes (e.g., side lobes 630B) appearing in the correlated return signal due to pulse compression may be weakly correlated and identified as such by comparing against a lower bound that is derived from the received return signal scaled based on the energy of the transmitted pulse. Other portions of the correlated return signal that are affected by interference, noise, or other artifacts may also be weakly correlated, and thus identified and attenuated to provide an improved signal-to-noise ratio. In this regard, the weight $w_1$ for the lower bound may, for example, be understood as controlling how well-correlated the sampled points of the correlated return signals have to be in order to pass unattenuated. In addition, by comparing the correlated return signal against an upper bound that is derived from the received return signal scaled based on the energy of the transmitted pulse, those portions of the correlated return signal that may not be sufficiently correlated but still exhibit a large amplitude (e.g., magnitude), for example due to a target having a large size or due to clipping or other distortion, may also be identified and effectively attenuated.

Therefore, according to various embodiments, the correlated return signal may be selectively attenuated to effectively suppress undesirable side lobes and/or other effects of noise, interference, distortion in the correlated return signal, thereby providing improved deconvolution of targets in a detection and ranging system. In contrast to conventional amplitude and/or frequency shaping (e.g., windowing or weighting) techniques that are not always effective at removing or reducing all side lobes or other undesirable artifacts, techniques disclosed herein according to various embodiments advantageously achieve effective suppression of weakly correlated portions of the correlated return signal through selective attenuation based on a comparison of the correlated return signal against one or more bounds derived from the received return signal and the energy of the pulse as discussed above for various embodiments. At block 360, the selectively attenuated correlated signal (e.g., $z[n]$ of Equation 5), which may comprises the correlated return signal with weakly correlated and/or distorted portions suppressed by the selective attenuation as discussed above, may be provided as an output signal (e.g., by output. For example, the output signal may be provided for further processing (e.g., video signal processing) and/or rendering a detection and ranging image (e.g., a radar or sonar image) on a display.

Example results of such improved deconvolution of targets by selective attenuation of a correlated return signal according to various embodiments of the disclosure are illustrated in the example plots shown in FIGS. 7A through 7F. In the example plots of FIGS. 7A through 7F, a return signal 710A-710F (e.g., corresponding to the return signal u discussed above in connection with Equations 1 through 5), sampled points of a correlated return signal 720A-720F (e.g., corresponding to the correlated return signal y discussed above in connection with Equations 1 through 5), and a selectively attenuated correlated return signal 730A-730F (e.g., corresponding to the selectively attenuated correlated return signal z discussed above in connection with Equation 5) are plotted, where the x-axis represents a range or distance and the y-axis represents an amplitude or magnitude (e.g., power) of signals. Modeled sizes and ranges of targets 740A-740F and 745C-745D are also illustrated in FIGS. 7A through 7F to aid the understanding of the various plotted signals relative to the modeled target.

Figure 7A:
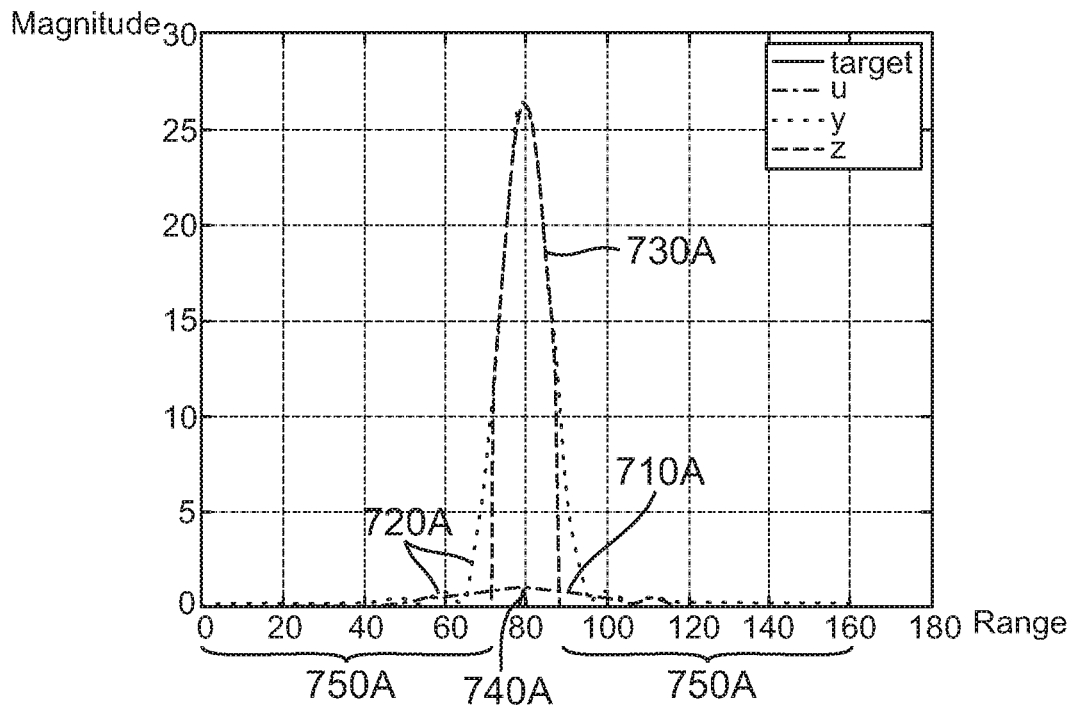
FIGS. 7A-7F illustrate example plots of a return signal, a correlated return signal, and a selectively attenuated correlated return signal in accordance with various embodiments of the disclosure.

In particular, FIG. 7A illustrates an example result of transmitting a pulse toward and receiving a return signal reflected from a target 740A modeled as a unit impulse at range=80. The pulse is frequency-modulated (e.g., for pulse compression) and has a triangular envelope. A correlated return signal 720A is determined based on a return signal 710A and the pulse, and selectively attenuated based on a comparison against lower and upper bounds that are scaled versions of return signal 710A to output a selectively attenuated correlated return signal 730A as discussed above for various embodiments. Specifically for the example of FIG. 7A, the weight $w_3$ for attenuation is set to zero, and with the coefficients $k_1$ and $k_2$ for determining the lower and upper bounds are set at $k_1=0.5$ and $k_2=10$. As shown, portions 750A of correlated return signal 720A that fall outside the scaled versions of return signal 710A defining the lower and the upper bounds are completely removed, thereby producing selectively attenuated correlated return signal 730A that is narrower for improved resolution and detection and without the side lobes that are in portions 750A. Side lobes were present in correlated return signal 720A even though a triangular pulse envelope was used to reduce side lobes, but selectively attenuated correlated return signal 730A obtained by embodiments of the disclosure advantageously removed even those persistent side lobes.

Figure 7B:
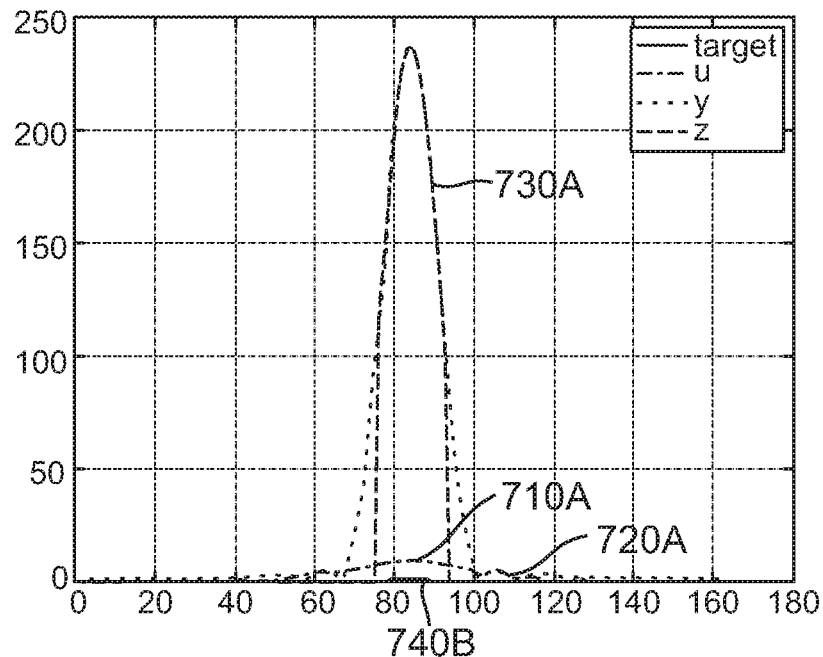

FIG. 7B illustrates an example result of a case similar to that of FIG. 7A, but with a target 740B modeled to have a larger extent or size of 10 samples. As shown, even though the correlated return signal 720B now has side lobe with larger amplitude, those side lobes are effectively suppressed by the selective attenuation based on a comparison against scaled versions of the return signal 710B which also exhibits larger amplitude. As a result, the selectively attenuated correlated return signal 730B exhibits a narrow peak without the side lobes for an improved resolution and detection, similar to the correlated return signal 730A of FIG. 7A.

Figure 7C:
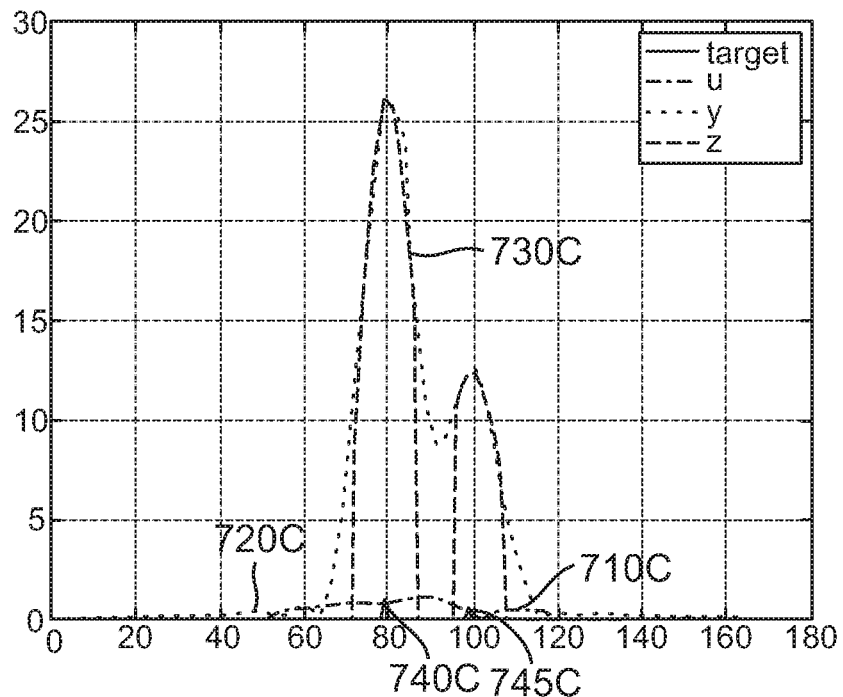
Figure 7D:
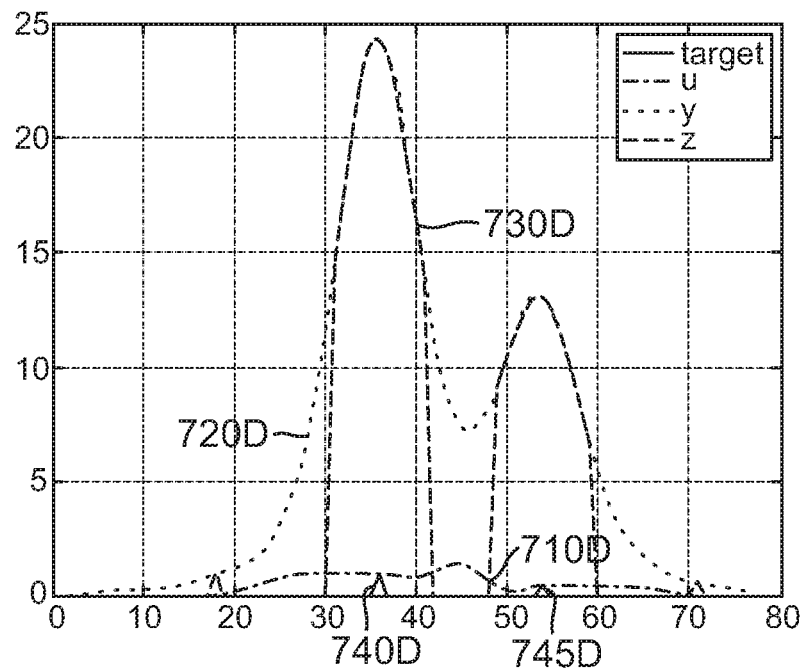

FIGS. 7C and 7D illustrate example results for cases with two targets. The two targets 740C and 745C in FIG. 7C are modeled as two impulses of different amplitudes. Similarly, the two targets 740D and 745D in FIG. 7D are modeled as two impulses of different amplitudes. In the example of FIG. 7C, a pulse having a triangular envelope is transmitted, whereas in the example of FIG. 7D, a pulse having a trapezoidal envelope is transmitted. The weight $w_3$ and the coefficients $k_1$ and $k_2$ are set at similar values as in the example cases of FIGS. 7A and 7B. As shown, it is difficult to separate the two targets in the correlated return signals 720C and 720D in both FIGS. 7C and 7D, even though a pulse compression technique was employed to improve the ranging resolution. In fact, if the correlated return signals 720C and 720D were used to generate detection and ranging information (e.g., to render a radar or sonar image), it may well show one large target rather than two different targets at two different ranges. In contrast, the selectively attenuated correlated return signals 730C and 730D exhibit much improved target separation that allows two separate targets to be identified while also significantly reducing the side lobes.

Figure 7E:
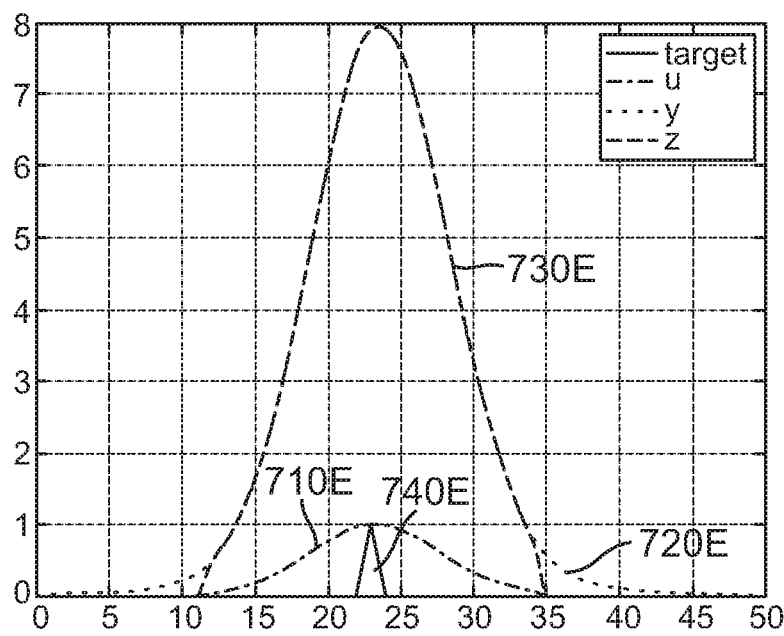
Figure 7F:
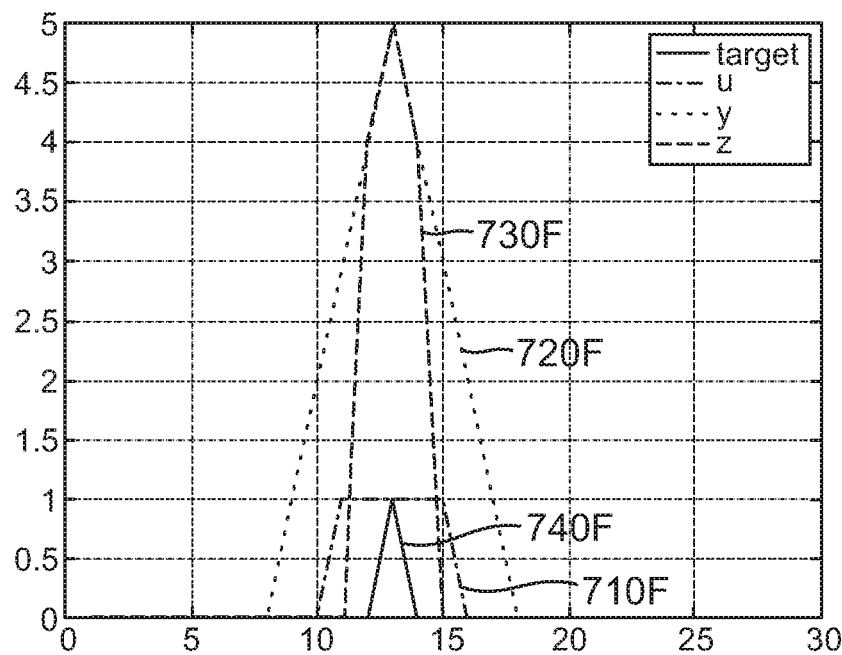

FIGS. 7E and 7F illustrate example results for cases in which little or no side lobes may appear in the correlated return signals. In the example of FIG. 7E, a frequency-modulated pulse is transmitted (e.g., for pulse compression), but a Gaussian pulse envelope is used such that the correlated return signal 720E has little or no side lobes. As shown, the selectively attenuated correlated return signal 730E obtained by the techniques discussed above with reference to FIG. 3 through FIG. 6B has a narrower shape (e.g., a narrower range extent) compared with the correlated return signal 720E, thereby still providing the benefit of improved resolution and detection without undesirably degrading or distorting the correlated return signal 720E. In the example of FIG. 7F, a square pulse (with a sample size M=5 for Equation 2) is transmitted without frequency modulation (e.g., no pulse compression), and thus did not introduce any side lobe in the correlated return signal 720F.

Similar to the example of FIG. 7E, the selectively attenuated correlated return signal 730F in FIG. 7F has a narrower range extent than the correlated return signal 720F for improved resolution and detection without being undesirably degraded or distorted. The coefficient $k_1$ for determining the lower bound is set to 0.75 in the example case of FIG. 7F instead of 0.5 used in other example cases of FIGS. 7A through 7E, so as to raise the lower bound for rejecting weakly correlated portions of the correlated return signal 720F while still selecting meaningful portions of the correlated return signal 720F. For example, the coefficient $k_1$ may be increased to raise the lower bound up to a point beyond which the selectively attenuated correlated return signal 730F is undesirably degraded or distorted because meaningful portions of the correlated return signal 720F are rejected.

Embodiments of the present disclosure can thus provide improved deconvolution of targets by selective signal attenuation to effectively suppress side lobes or effects of interference, distortion, or other artifacts appearing in the received return signals. Such embodiments may be used to provide sonar, radar, and/or other detection and ranging systems with improved range resolution and target separation to assist in navigation of a mobile structure, survey of a body of water, and/or to assist in the operation of other systems, devices, and/or sensors coupled to the mobile structure.

Interference occurs in ranging systems (e.g., radars and sonars) from other ranging systems operating in the same or close frequencies. In some ranging systems, for each range measurement, a large number of pulses can be emitted, and the corresponding returns can be processed with a running average taken independently for each range measurement to improve the signal to noise ratio for the range measurement. Even a large number of small amplitude values in a range measurement can be significantly perturbed by one interference event, which can be several orders of magnitude larger in amplitude than any portion of an actual target response. The resulting interference can therefore spread into and degrade any signal processing that relies on a portion of the running average.

Conventionally, a pre-average filter is applied to the returns to reject interference before new returns are entered into the running average. These filters are typically non-linear filters such as a median filter of three adjacent returns. However, if multiple other radars are present, then the probability of two interference events occurring within the three adjacent returns is too high, and the interference often escapes the pre-average filter and enters the running averaging filter and appears in resulting ranging system imagery (e.g., radar or sonar imagery). The probability of interference escaping the pre-average filter and getting to the moving average filter can be significantly reduced by passing the minimum rather than the median of the three adjacent returns to the running average filter.

In various embodiments, interference events may be reliably rejected from ranging system returns by comparing a received return with that expected from a target illuminated by the ranging system, as determined by characteristics of its particular ranging sensor, and rejecting or attenuating returns or portions of returns that fail to match those characteristics in time or space.

Such method may be distilled into a two step process: (1) comparing the gradient of the amplitude of a return with the expected gradient of the ranging sensor (e.g., where the gradient is the rate of change of the amplitude of the received signal as a function of time or angle, for example); and (2) rejecting or attenuating returns that have too large a gradient, as compared to the expected gradient, to be consistent with a target illuminated by the ranging sensor.

It has been found that the probability of interference escaping the pre-average filter and entering the running average filter is too high, particularly as the number of interfering ranging sensor systems increases. In one embodiment, a pre-average filter may be constructed where the minimum of between 3 and 10 adjacent returns may be used as the pre-average filter. In another embodiment, the rate of change (e.g., gradient) of the amplitude of a return (e.g., as a function of distanced traveled (for sonar) or antenna angle (for radar)) may be determined and compared to an estimated maximum gradient for a corresponding ranging sensor. Returns that exceed a maximum gradient are rejected prior to passing them to the moving average filter. Both techniques can be used separately or together to provide interference rejection in ranging systems.

Radars and sonars share a common use of 'fast-time' and 'slow-time' qualifiers, which for radars is the range direction and azimuth direction respectively and for sonars is range and boat motion respectively. To simplify this description, azimuth shall be taken to describe the 'slow-time' coordinate for radars, sonars, and/or other ranging systems.

Provided is an interference filter to reject non-target signals received in the azimuth direction. The interference filter may be controlled by an azimuth gradient limit (e.g., $g_{max}$), an amplitude threshold $A_T$, and a window size N corresponding to the number of adjacent returns used to generate the filter output.

For radars, the antenna's azimuth response characteristics may be used to specify the gradient limit. The amplitude threshold and window size may be used to deal with cases where actual returns (e.g., echoes from targets) are clipped and the determined gradient of the return is not representative of the true gradient. The interference filter removes interference of any extent where the interference is below the amplitude threshold, and the interference filter is capable of removing interference less than the window size if the interference exceeds the amplitude threshold. The gradient limit may be determined in practice using measurements of the antenna response or by estimation. In some embodiments, the antenna response may be approximated to a sinc function and an estimate of the maximum gradient obtained based on the sinc function. The interference filter may be directly implementable in an FPGA and/or other logic device and/or analog circuitry (e.g., controller 220, transceiver 234, and/or transceiver/controller 240) and in some embodiments can be implemented using elements consisting only of circular buffers, subtractors and comparators.

FIG. 8 illustrates an interference filter for a ranging system in accordance with an embodiment of the disclosure. In particular, function 800 illustrates an embodiment of a gradient filter, as described herein. In the embodiment shown in FIG. 8, let x be the input sample and y be the output sample. A minimum target size N (e.g., over which all signals are considered targets), a maximum input amplitude $A_{max}$ (e.g., for which the input signal is clipped) and a gradient limit $g_{max}$ are all preselected to control general operation of gradient filter 800. Two circular buffers B and C of length N are initialized, where variables j, k and l are indices to the circular buffers, and where the indices may be initialized as j=N, k=2 and l=1. An amplitude threshold $A_T$ may be set according to $A_T = A_{max}/2$.

As shown in FIG. 8, gradient filter 800 may be implemented as a software function used determine the sample output y, given input x. In various embodiments, gradient limit $g_{max}$ may be determined in practice using measurements of the ranging sensor (e.g., antenna) response and/or by estimation. The response may be approximated to a sinc function, for example, and an estimate of the maximum gradient obtained through inspection of the sinc function. It should be noted that as $g_{max}$ approaches infinity, y is simply x delayed by N samples.

More particularly, lines 5-11 of gradient filter 800 are configured to exclude returns associated with targets from operation of gradient filter 800. For example, actual target responses may be defined to have widths (in terms of adjacent returns) greater than or equal to N, and lines 5-11 operate to leave the amplitudes of such returns unchanged by lines 13-19 (e.g., by passing them through delay buffer as an output of gradient filter 800). Lines 13-16 calculate a local gradient and compare it to gradient limit $g_{max}$, and line 17 filters the returns (e.g., by setting their amplitudes to a minimum value across a series or window of returns, for example, or to zero) if the local gradient is larger than the gradient limit. If the local gradient is equal to or smaller than the gradient limit, the amplitudes remain unchanged. Lines 22-24 are configured to update the circular buffer indices after each iteration of gradient filter 800.

FIGS. 9A-B illustrate an interference filter for a ranging system in accordance with an embodiment of the disclosure. In particular, function 900 illustrates an embodiment of a gradient filter similar to gradient filter 800, as described herein. More particularly, portion 910 of gradient filter 900 initializes circular buffers for operation of gradient filter 900, portion 912 operates to leave the amplitudes of actual target responses unchanged by gradient filter 900 (e.g., other than delay), portion 914 calculates a local gradient and compares it to the gradient limit, and line 916 filters the returns (e.g., by setting them to a minimum value across a series or window of returns) if the local gradient is larger than the gradient limit. Portion 918 is configured to update the circular buffer indices after each iteration of gradient filter 900.

Figure 10A:
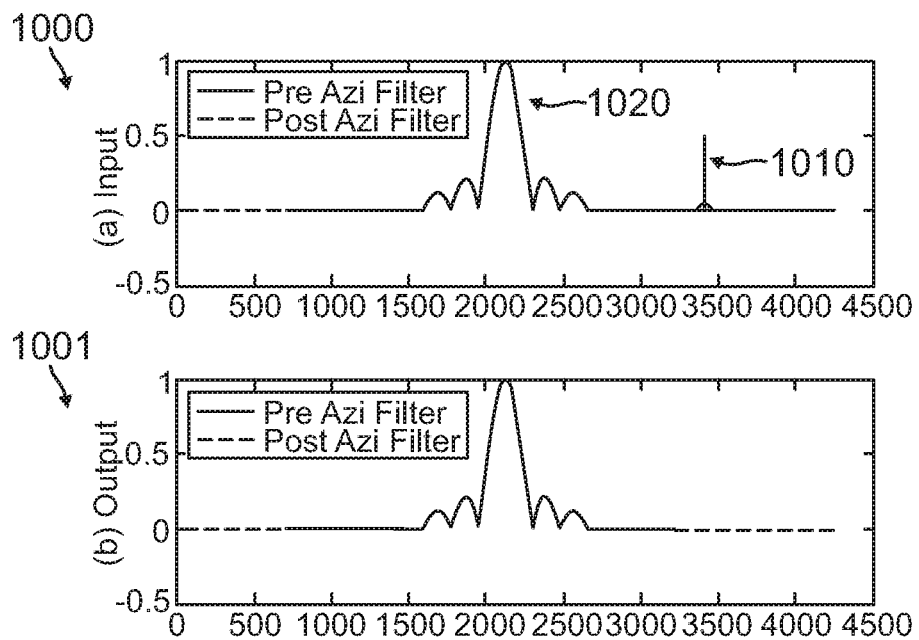
FIGS. 10A-C illustrate example plots of unfiltered and filtered ranging system returns in accordance with various embodiments of the disclosure.
Figure 10B:
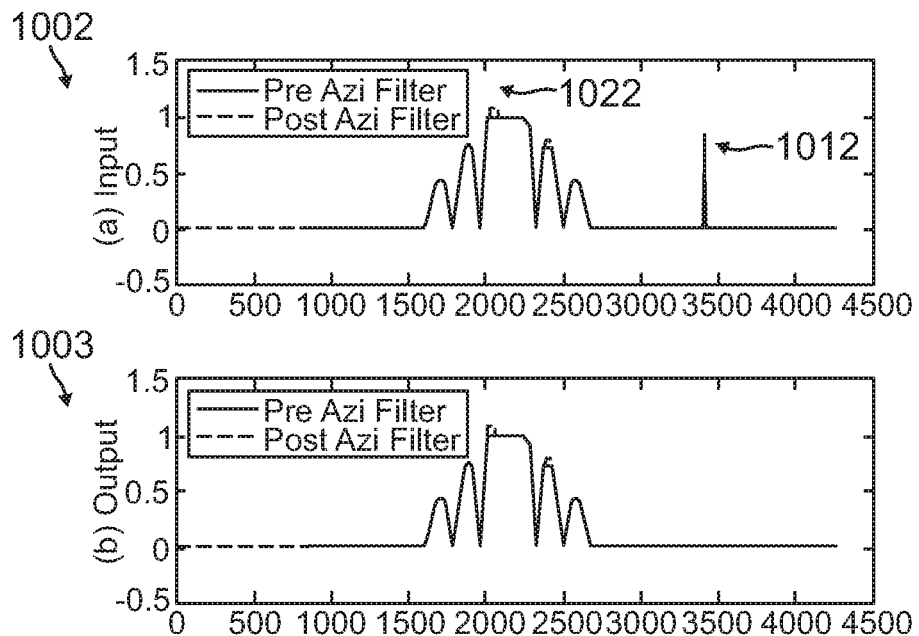
Figure 10C:
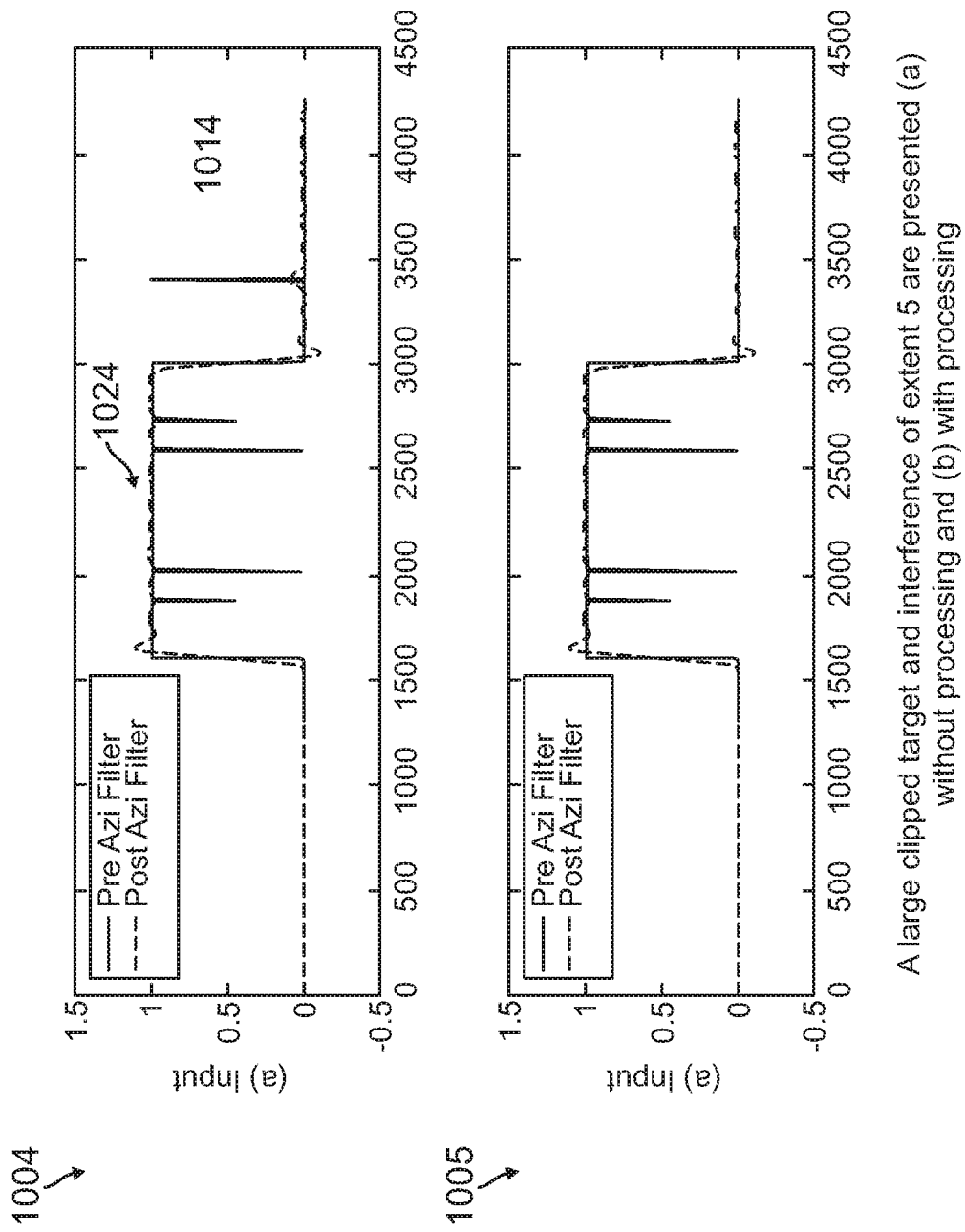

FIGS. 10A-C illustrate example plots of unfiltered and filtered ranging system returns in accordance with various embodiments of the disclosure. In particular, FIGS. 10A-C show the result of applying gradient filter 800 and/or 900 to ranging sensor returns. For example, FIG. 10A includes graph 1000 showing a series of returns across a range of azimuths (e.g., measured from 0 to 4500, corresponding to time) including target response 1020 before being filtered by gradient filter 800 and/or 900, and graph 1001 showing the same series of returns after being filtered by gradient filter 800 and/or 900. As can be seen in FIG. 10A, interference peak 1010 has been removed from the series of returns by application of gradient filter 800 and/or 900, and target response 1020 has been left substantially unchanged.

FIG. 10B includes graph 1002 showing a series of returns before being filtered by gradient filter 800 and/or 900, and graph 1003 showing the same series of returns after being filtered by gradient filter 800 and/or 900, where target response 1022 is slightly clipped. As can be seen in FIG. 10A, interference peak 1010 has been removed from the series of returns by application of gradient filter 800 and/or 900, and slightly clipped target response 1022 has been left substantially unchanged.

FIG. 10C includes graph 1004 showing a series of returns before being filtered by gradient filter 800 and/or 900, and graph 1005 showing the same series of returns after being filtered by gradient filter 800 and/or 900, where target response 1024 is heavily clipped. As can be seen in FIG. 10A, interference peak 1010 has been removed from the series of returns by application of gradient filter 800 and/or 900, and heavily clipped target response 1022 has been left substantially unchanged. Testing indicates, the results are similar for interference peaks overlapping unclipped and clipped target responses.

Figure 11:
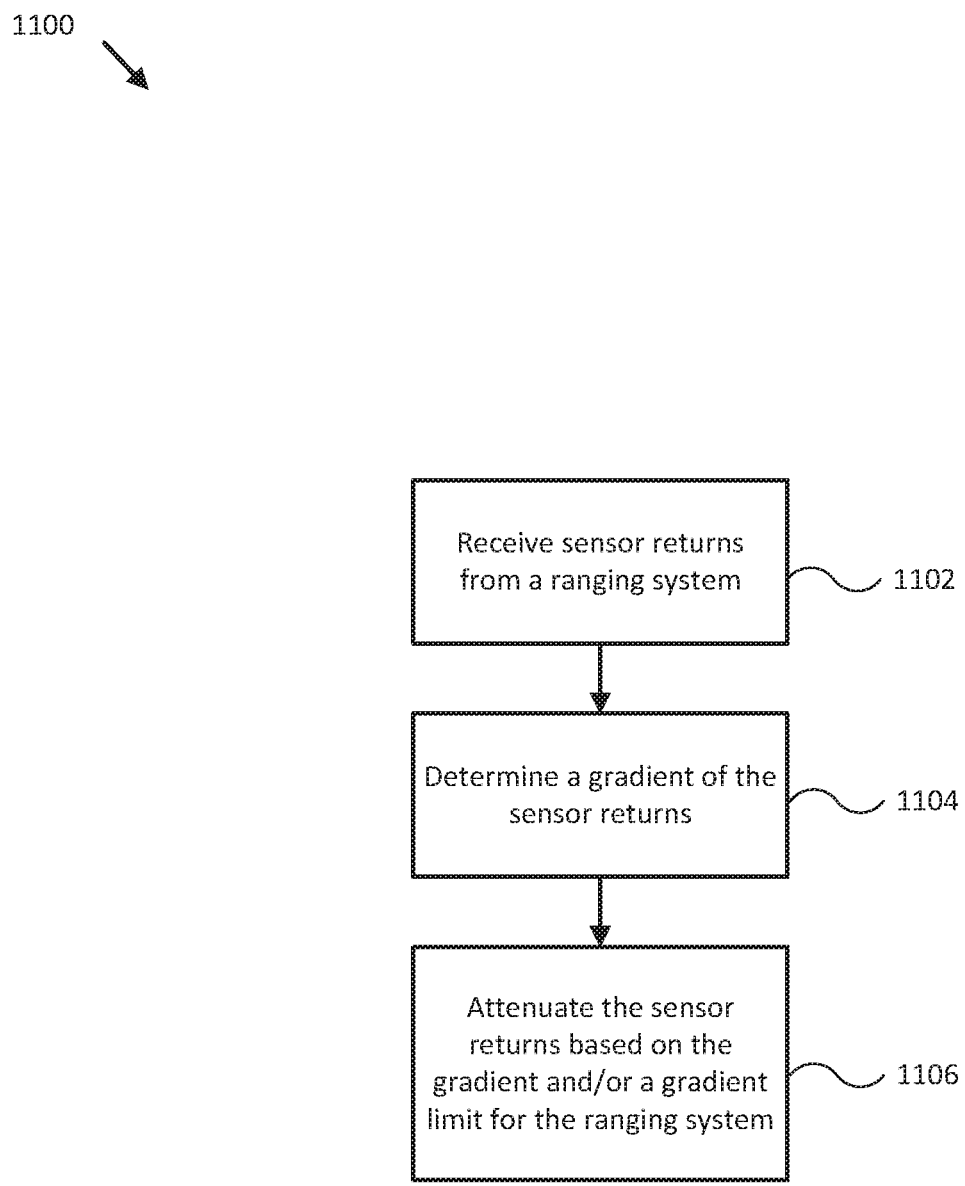
FIG. 11 illustrates a flow diagram of various operations to filter interference in a ranging system in accordance with an embodiment of the disclosure.

FIG. 11 illustrates a flow diagram of various operations to filter interference in a ranging system in accordance with an embodiment of the disclosure. In some embodiments, the operations of FIG. 11 may be implemented as software instructions executed by one or more logic devices associated with corresponding electronic devices, sensors, and/or structures depicted in FIGS. 1A through 2. More generally, the operations of FIG. 11 may be implemented with any combination of software instructions and/or electronic hardware (e.g., inductors, capacitors, amplifiers, actuators, or other analog and/or digital components).

It should also be appreciated that any step, sub-step, sub-process, or block of process 1100 may be performed in an order or arrangement different from the embodiments illustrated by FIG. 11. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 1100 is described with reference to systems described in FIGS. 1A-2, process 1100 may be performed by other systems different from those systems and including a different selection of electronic devices, sensors, assemblies, mobile structures, and/or mobile structure attributes.

At block 1102, sensor returns are received from a ranging system. For example, transceiver 234 of transceiver/controller 240 may be configured to receive a radar return from antenna 264 of radar system 160. In some embodiments, the sensor returns may be adjacent sensor returns, in time, distance, and/or azimuth, as appropriate.

At block 1104, a gradient of the sensor returns received in block 1102 is determined. For example, controller 220 of transceiver/controller 240 may be configured to determine a gradient of a first or second sensor return provided by antenna 264. In some embodiments, the gradient may be determined by subtracting one sensor return from the other and attributing the gradient to the sensor return with the large amplitude. In other embodiments, the gradient may be determined based on a number of different sensor returns, such as an average over three or more sensor returns.

At block 1106, the sensor returns received in block 1102 are attenuated based on the gradient determined in block 1104 and/or a gradient limit for a corresponding ranging system. For example, selective attenuator 246 of transceiver/controller 240 may be configured to set one sensor return amplitude to the other and/or one or the other to zero, if the determined gradient is larger than the gradient limit. In some embodiments, selective attenuator 246 may be configured to leave the amplitudes unchanged if the determined gradient is the same as or less than the gradient limit. In such embodiments, selective attenuator 246 may be configured to pass the sensor returns through a unity data buffer, for example, or to retain their values (though possibly delayed). In various embodiments, selective attenuator 246 and/or comparator 250 may be configured to determine that the sensor returns represent an actual target response (e.g., where a certain number of contiguous adjacent sensor returns all have amplitudes above a threshold value) and to leave their amplitudes unchanged.

Embodiments of the present disclosure can thus provide improved interference rejection in ranging sensor data, even when the primary target response is heavily clipped. Such embodiments may be used to provide sonar, radar, and/or other detection and ranging systems with improved range resolution, target separation, and general reliability in relatively crowded environments (e.g., with many different ranging systems interfering with each other) to assist in navigation of a mobile structure, survey of a body of water, and/or to assist in the operation of other systems, devices, and/or sensors coupled to a mobile structure.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method comprising:
   transmitting a pulse having a carrier wave toward a target;
   receiving at least a portion of the pulse reflected from the target as a return signal;
   determining a correlated return signal based on the return signal and the pulse;
   comparing the correlated return signal against one or more bounds that are determined relative to the return signal;
   attenuating portions of the correlated return signal that fall outside the one or more bounds; and
   providing the correlated return signal with weakly correlated and/or distorted portions suppressed by the attenuating.

2. The method of claim 1, wherein the one or more bounds comprise:
   a lower bound determined based on the return signal scaled by a first weight; and
   an upper bound determined based on the return signal scaled by a second weight.

3. The method of claim 2, wherein the first and the second weights are determined based on the energy in the pulse.

4. The method of claim 3, wherein the second weight is determined further based on sizes of targets to be detected.

5. The method of claim 1, wherein the attenuating of the portions of the correlated return signal comprises scaling the portions of the correlated return signal by a third weight that is greater than or equal to zero and less than one.

6. The method of claim 5, further comprising:
adjusting the third weight, and
detecting targets from peaks of the correlated return signal with weakly correlated and/or distorted portions suppressed by the attenuating.

7. The method of claim 1, wherein the determining of the correlated return signal comprises determining a cross-correlation between the return signal and the pulse.

8. The method of claim 1, wherein:
the transmitting of the pulse comprises modulating a frequency or a phase of the carrier wave within the pulse to perform pulse compression; and
the attenuating comprises suppressing side lobes in the correlated return signal due to the pulse compression.

9. The method of claim 1, wherein:
the pulse is a radar pulse having a radio frequency (RF) wave as the carrier wave or a sonar pulse having an audio frequency (AF) wave as the carrier wave; and
the transmitting of the pulse comprises shaping an envelope of the pulse into a rectangular, triangular, trapezoidal, or Gaussian envelope.

10. The method of claim 1, wherein the return signal comprises a first sensor return received from a ranging system, the method further comprising:
receiving a second sensor return from the ranging system;
determining a gradient of the first and/or second sensor return; and
attenuating the first and/or second sensor return based, at least in part, on the determined gradient and/or a gradient limit for the ranging system.

11. A system, comprising:
a transceiver/controller comprising:
a pulse generator configured to generate a pulse having a carrier wave;
a correlator configured to determine a correlated return signal based on a return signal and the pulse, the return signal representing at least a portion of the pulse reflected from a target;
a selective attenuator configured to compare the correlated return signal against one or more bounds that are determined relative to the return signal and attenuate portions of the correlated return signal that fall outside of the one or more bounds; and
an output configured to provide the correlated return signal as a target ranging signal with weakly correlated and/or distorted portions of the correlated return signal suppressed by the selective attenuator; and
a transducer or antenna coupled to the transceiver/controller and configured to transmit the pulse toward the target and receive the portion of the pulse reflected from the target.

12. The system of claim 11, wherein the one or more bounds comprise:
a lower bound determined based on the return signal scaled by a first weight; and
an upper bound determined based on the return signal scaled by a second weight.

13. The system of claim 12, wherein the first and the second weights are determined based on the energy in the pulse.

14. The system of claim 13, wherein the second weight is determined further based on sizes of targets to be detected.

15. The system of claim 11, wherein the selective attenuator is configured to attenuate the portions of the correlated return signal at least by scaling the portions of the correlated return signal by a third weight that is greater than or equal to zero and less than one.

16. The system of claim 11, wherein:
the selective attenuator is configured to adjust the third weight, and
the transceiver/controller is configured to detect targets from peaks of the target ranging signal.

17. The system of claim 11, wherein:
the correlator is configured to determine the correlated return signal at least by determining a cross-correlation between the return signal and the pulse; and
the correlator and the selective attenuator are implemented in a field programmable gate array (FPGA) or a digital signal processor (DSP).

18. The system of claim 11, wherein
the pulse generator is configured to modulate a frequency or a phase of the carrier wave within the pulse to perform pulse compression; and
side lobes in the correlated return signal due to the pulse compression are suppressed by the selective attenuator.

19. The system of claim 11, wherein the pulse generator is configured to shape an envelope of the pulse into a rectangular, triangular, trapezoidal, or Gaussian envelope, and wherein:
the carrier wave for the pulse is a radio frequency (RF) wave and the system comprises a radar; or
the carrier wave for the pulse is an audio frequency (AF) wave and the system comprises a sonar.

20. The system of claim 11, wherein the return signal comprises a first sensor return received from the transducer or antenna, and wherein the transmitter/controller is configured to receive a second sensor return from the transducer or antenna, the system further comprising:
a subtractor configured to determine a gradient of the first and/or second sensor return; and
a selective attenuator configured to attenuate the first and/or second sensor return based, at least in part, on the determined gradient and/or a gradient limit for the system.

* * * * *

UNITED STATES PATENT AND TRADEMARK OFFICE
CERTIFICATE OF CORRECTION

Page 1 of 1

PATENT NO. : 10,838,040 B2
APPLICATION NO. : 15/977095
DATED : November 17, 2020
INVENTOR(S) : Richard Jales, Nicholas St. Hill and Stephen Tostevin It is certified that error appears in the above-identified patent and that said Letters Patent is hereby corrected as shown below:

In the Specification

In Column 25, Line 61:
Change "y[n](f *u)[n]" to --y[n] = (f*u)[n]--

In Column 27, Line 26:
Change "
$$z[n] = \begin{cases} y[n], & \text{if } w_1|u[n-m]| \le |y[n]| < w_2|u[n+m]|, \\ w_3 y[n], & \text{otherwise} \end{cases} \quad \text{(Equation 5)}$$
" to
--
$$z[n] = \begin{cases} y[n], & \text{if } w_1|u[n-m]| \le |y[n]| < w_2|u[n-m]| \\ w_3 y[n], & \text{otherwise} \end{cases} \quad \text{(Equation 5),}$$
--

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*